(12) United States Patent
Kozuka et al.

(10) Patent No.: US 9,948,884 B2
(45) Date of Patent: *Apr. 17, 2018

(54) CONVERTING METHOD AND CONVERTING APPARATUS FOR CONVERTING LUMINANCE VALUE OF AN INPUT VIDEO INTO A SECOND LUMINANCE VALUE

(71) Applicant: Panasonic Intellectual Property Management Co., Ltd., Osaka (JP)

(72) Inventors: Masayuki Kozuka, Osaka (JP); Tadamasa Toma, Osaka (JP); Kengo Terada, Osaka (JP); Takahiro Nishi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/613,494

(22) Filed: Jun. 5, 2017

(65) Prior Publication Data

US 2017/0272687 A1    Sep. 21, 2017

Related U.S. Application Data

(63) Continuation of application No. 15/075,228, filed on Mar. 21, 2016, now Pat. No. 9,736,419, which is a (Continued)

(30) Foreign Application Priority Data

Jun. 3, 2015  (JP) .................. 2015-113504

(51) Int. Cl.
  *H04N 5/57*  (2006.01)
  *H04N 5/20*  (2006.01)
  *G06F 3/14*  (2006.01)

(52) U.S. Cl.
  CPC .............. *H04N 5/57* (2013.01); *G06F 3/14* (2013.01); *H04N 5/20* (2013.01);
  (Continued)

(58) Field of Classification Search
  CPC ....................................................... H04N 5/57
  (Continued)

(56) References Cited

U.S. PATENT DOCUMENTS

| 7,209,183 B2 * | 4/2007 | Kim ......................... H04N 5/57 348/673 |
| 8,208,039 B2 * | 6/2012 | Manabe .................. G06T 5/009 348/229.1 |

(Continued)

FOREIGN PATENT DOCUMENTS

JP    2008-167418    7/2008

OTHER PUBLICATIONS

International Search Report of PCT Application No. PCT/JP2015/002974 dated Sep. 8, 2015.

*Primary Examiner* — Paulos M Natnael
(74) *Attorney, Agent, or Firm* — Wenderoth, Lind & Ponack, L.L.P.

(57) ABSTRACT

In a converting method for converting luminance of an input video in order to display the video on a display device, the luminance of the video is a first luminance value in a first luminance range where a maximum luminance value is defined as a first maximum luminance value that exceeds 100 nit. The method includes acquiring a first luminance signal indicating a first luminance value of the video, selecting a luminance converting process to be executed from among a plurality of luminance converting processes based on a reference luminance value corresponding to reference reflectance included in first meta data of the acquired first luminance signal, converting the first lumi-
(Continued)

nance value indicated by the acquired first luminance signal into a second luminance value in a second luminance range where a maximum luminance value is defined as a second maximum luminance value that is smaller than the first maximum luminance value and larger than 100 nit based on the selected luminance converting process.

1 Claim, 43 Drawing Sheets

Related U.S. Application Data continuation of application No. PCT/JP2015/002974, filed on Jun. 15, 2015.

(60) Provisional application No. 62/015,702, filed on Jun. 23, 2014.

(52) U.S. Cl.
CPC ... *G09G 2360/16* (2013.01); *G09G 2370/022* (2013.01); *G09G 2370/04* (2013.01)

(58) Field of Classification Search
USPC ........................................ 348/687, 678, 673
See application file for complete search history.

(56) References Cited

U.S. PATENT DOCUMENTS

| 9,584,786 | B2* | 2/2017 | Atkins | H04N 5/44504 |
|---|---|---|---|---|
| 2005/0030431 | A1* | 2/2005 | Kim | H04N 5/57 348/678 |
| 2011/0007188 | A1* | 1/2011 | Manabe | G06T 5/009 348/240.2 |
| 2011/0193888 | A1* | 8/2011 | Yamato | G09G 3/342 345/690 |
| 2012/0327303 | A1 | 12/2012 | Sun et al. | |
| 2014/0210847 | A1* | 7/2014 | Knibbeler | G09G 5/006 345/589 |
| 2015/0356904 | A1* | 12/2015 | Nakatani | G09G 5/377 345/690 |
| 2015/0356948 | A1* | 12/2015 | Lin | G09G 5/10 345/690 |
| 2016/0080716 | A1* | 3/2016 | Atkins | H04N 5/44504 348/599 |
| 2016/0150180 | A1* | 5/2016 | Kozuka | H04N 5/913 386/254 |
| 2016/0269676 | A1* | 9/2016 | Yamamoto | H04N 19/70 |

* cited by examiner

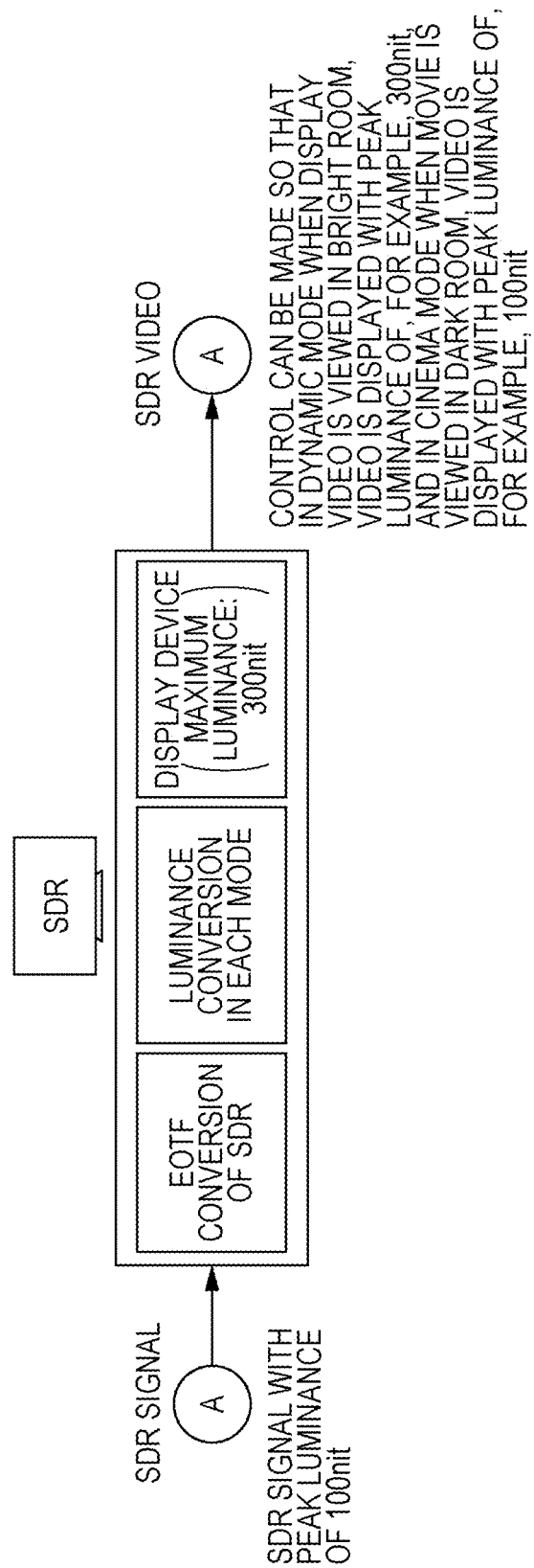

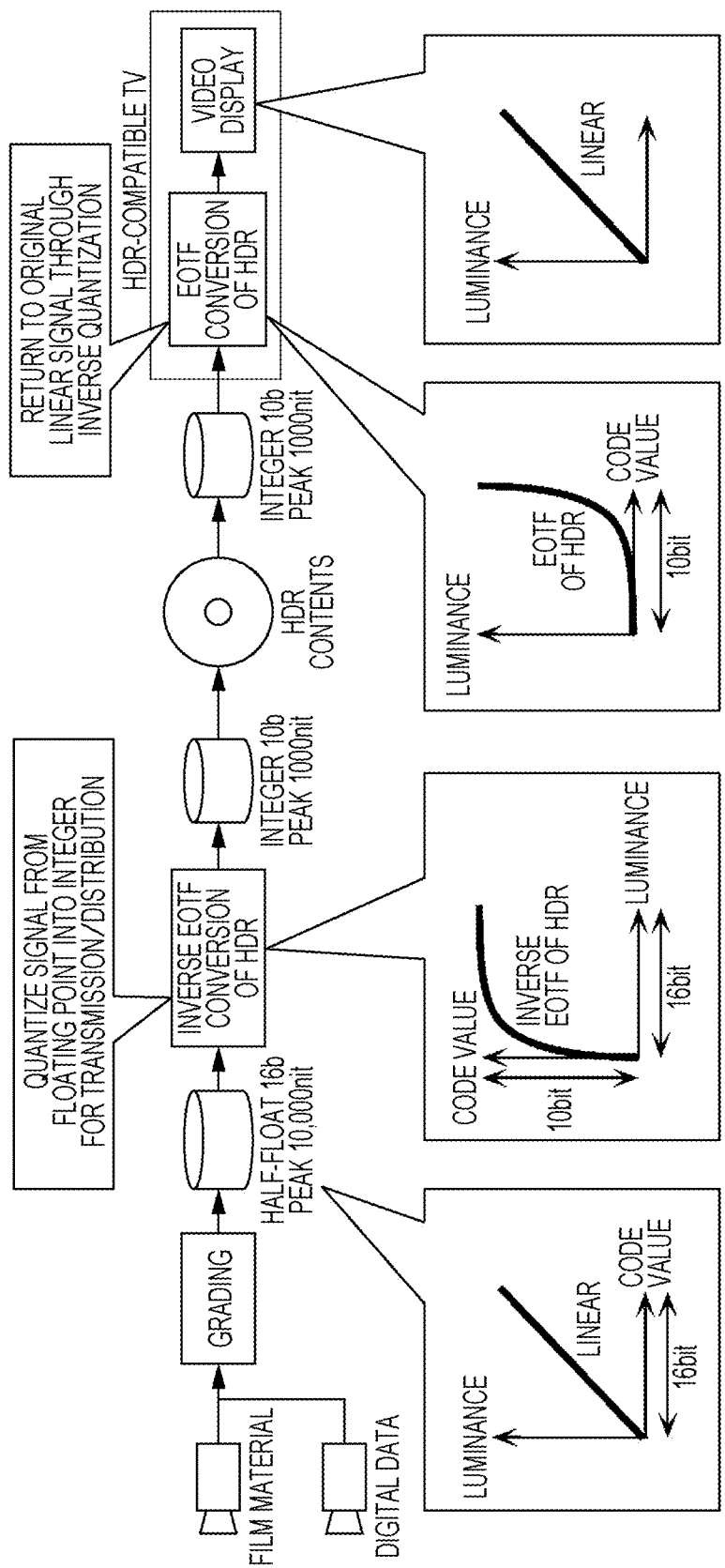

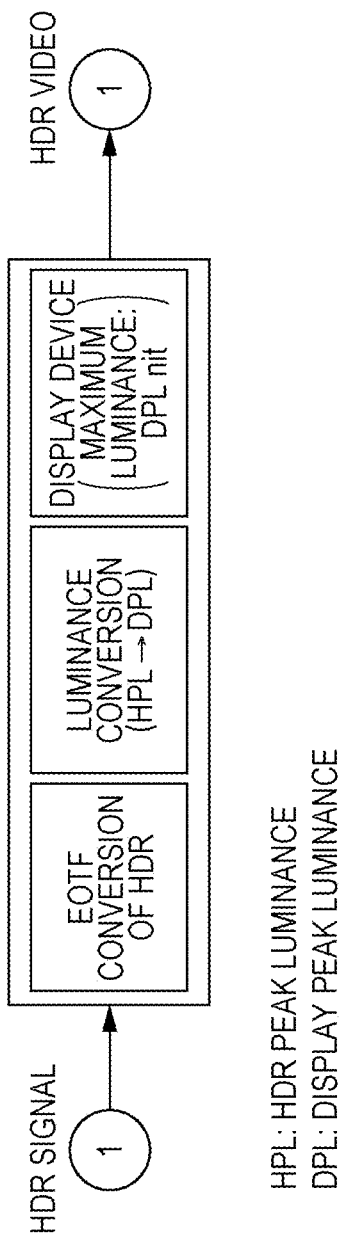

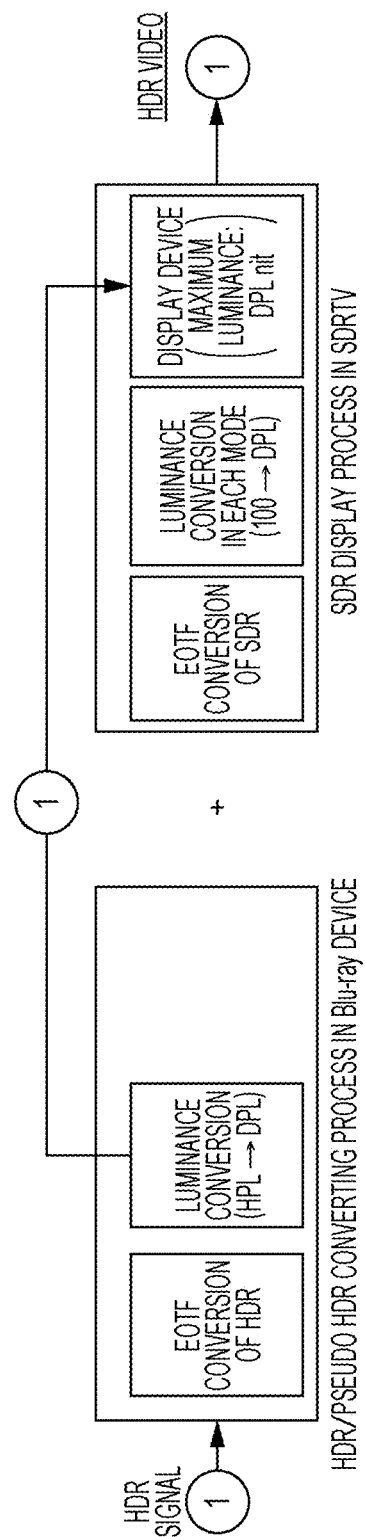

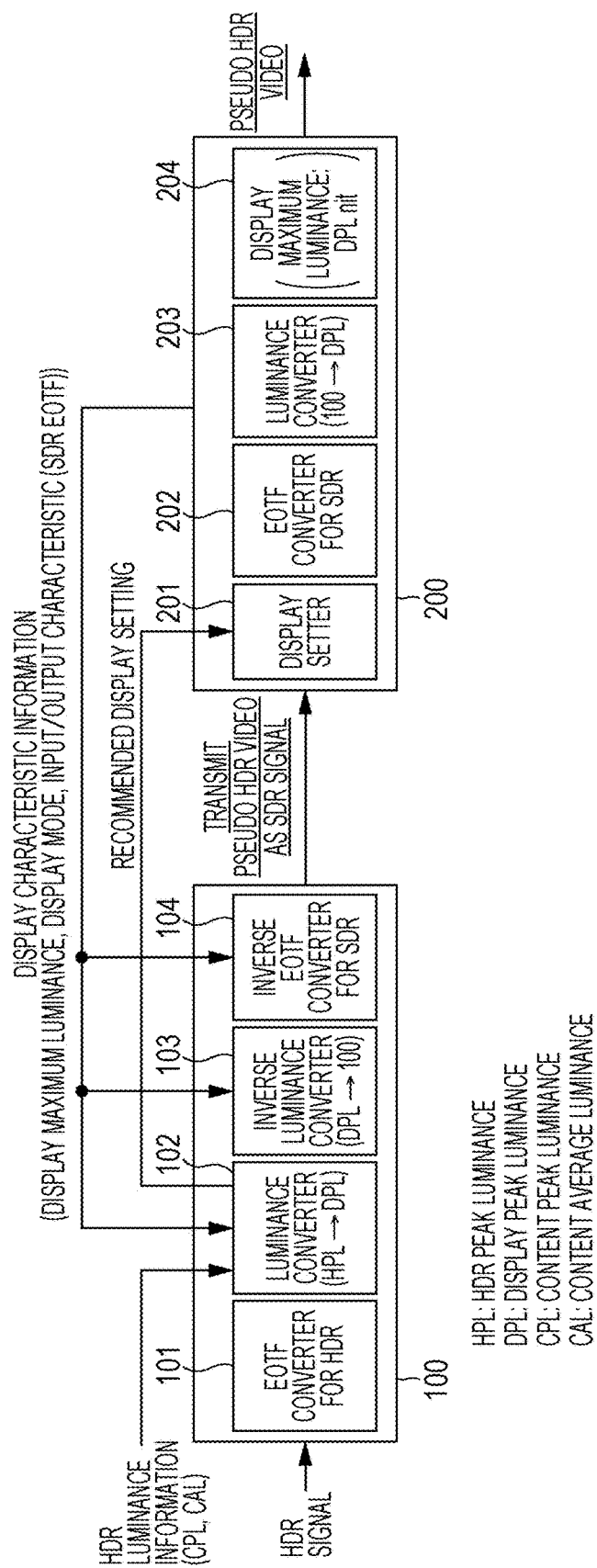

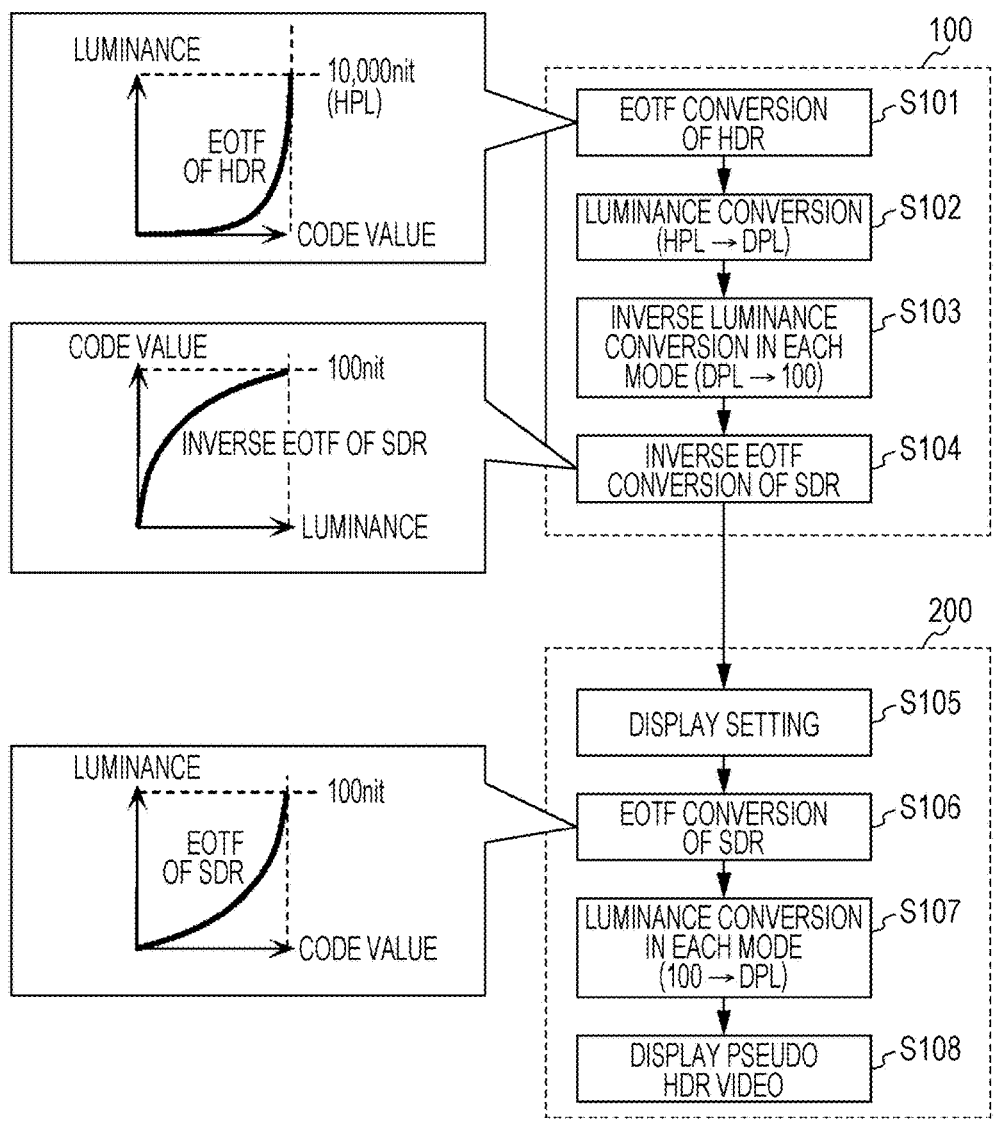

HPL: HDR PEAK LUMINANCE
DPL: DISPLAY PEAK LUMINANCE
CPL: CONTENT PEAK LUMINANCE
CAL: CONTENT AVERAGE LUMINANCE

HPL: HDR PEAK LUMINANCE
DPL: DISPLAY PEAK LUMINANCE
CPL: CONTENT PEAK LUMINANCE
CAL: CONTENT AVERAGE LUMINANCE

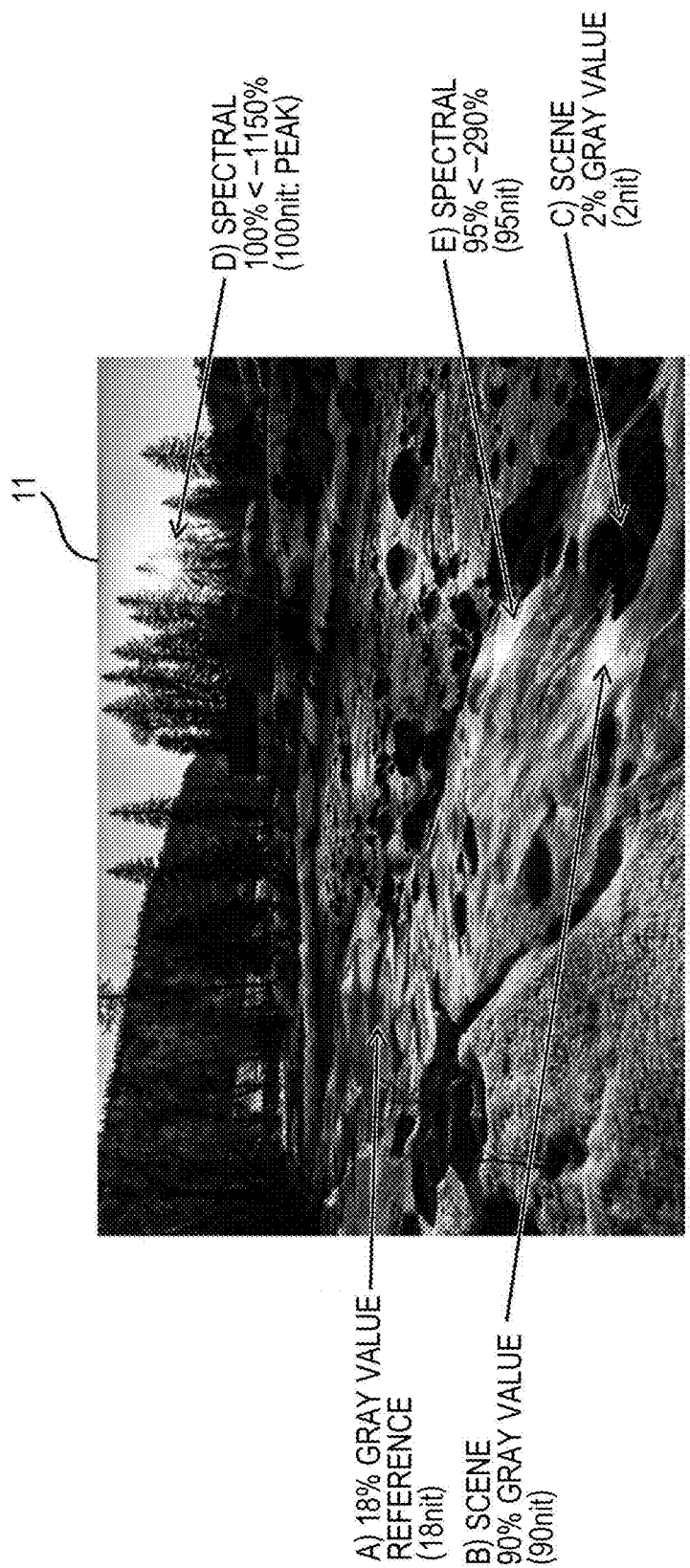

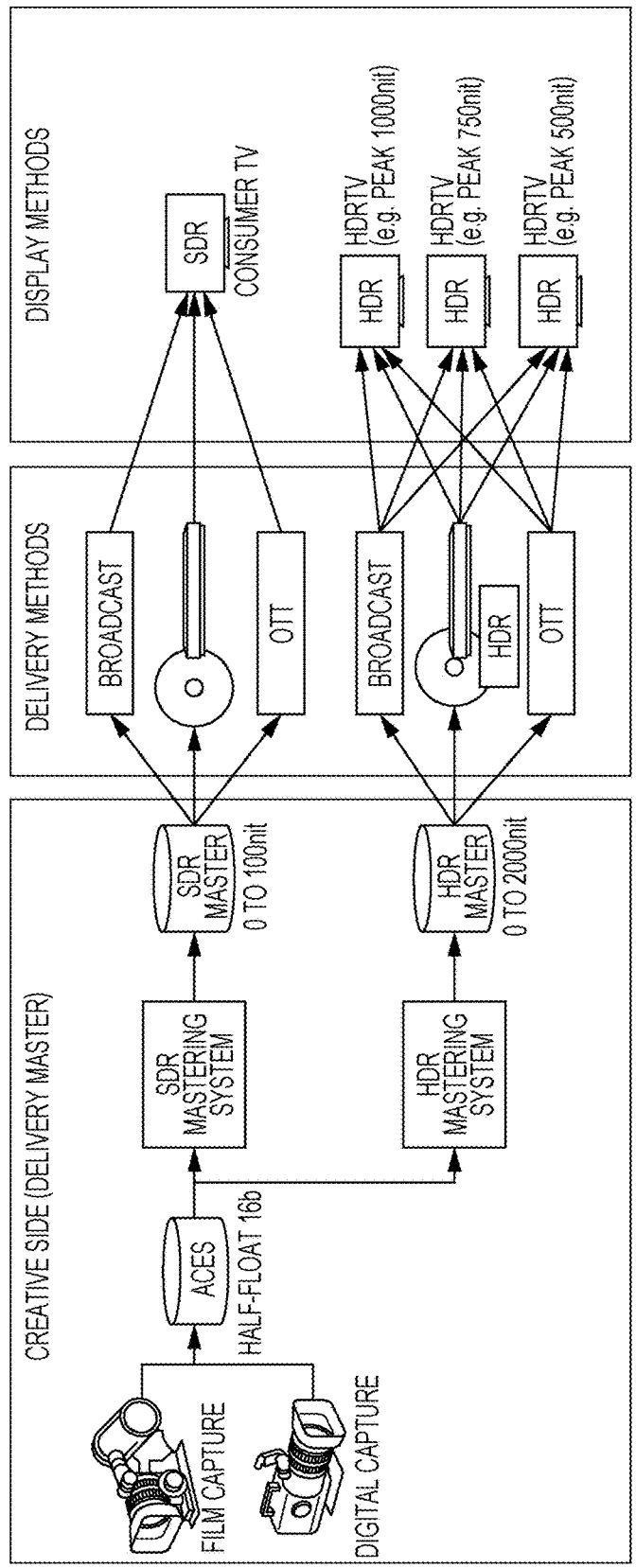

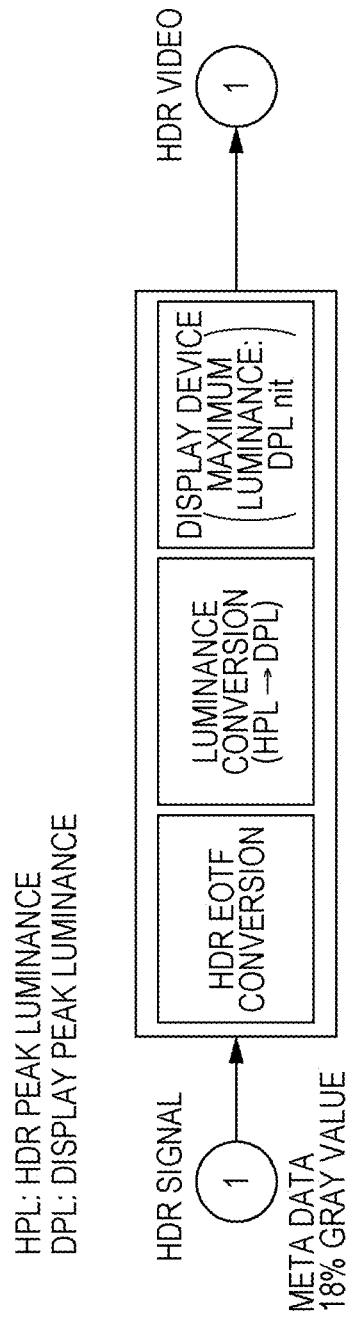

CONVERTING METHOD AND CONVERTING APPARATUS FOR CONVERTING LUMINANCE VALUE OF AN INPUT VIDEO INTO A SECOND LUMINANCE VALUE

BACKGROUND

1. Technical Field

The present disclosure relates to a converting method and a converting apparatus.

2. Description of the Related Art

Conventionally, an image signal processing apparatus for improving a displayable luminance level is disclosed (for example, see PTL 1).

CITATION LIST

Patent Literature

PTL 1: Unexamined Japanese Patent Publication No. 2008-167418

SUMMARY OF THE INVENTION

In one general aspect, the techniques disclosed here feature a converting method for converting luminance of an input video in order to display the video on a display device, including acquiring a first luminance signal indicating a first luminance value of the video in a first luminance range where a maximum luminance value is defined as a first maximum luminance value that exceeds 100 nit, the luminance of the video being formed by the first luminance value, selecting a luminance converting process to be executed from among a plurality of luminance converting processes based on a reference luminance value corresponding to reference reflectance included in first meta data of the acquired first luminance signal, and converting the first luminance value indicated by the acquired first luminance signal into a second luminance value in a second luminance range where the maximum luminance value is defined as a second maximum luminance value that is smaller than the first maximum luminance value and is larger than 100 nit based on the selected luminance converting process.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF DRAWINGS

FIG. 2B is a diagram describing the SDR display process in SDRTV where peak luminance is 300 nit;

FIG. 4 is an explanatory diagram illustrating a method for deciding a code value of a luminance signal to be stored in contents and a process for restoring a luminance value from the code value at a reproduction time;

FIG. 5A is a diagram illustrating one example of a display process for converting an HDR signal in HDRTV and executing HDR display;

FIG. 5B is a diagram illustrating one example of a display process for the HDR display using an HDR-compatible reproducing apparatus and SDRTV;

FIG. 6 is a block diagram illustrating a constitution of a converting apparatus and the display device according to an embodiment;

FIG. 7 is a flowchart illustrating a converting method to be performed by the converting apparatus and a display method to be performed by the display device according to the embodiment;

FIG. 16A is a diagram illustrating one example of the luminance value of a result of mastering an original image illustrated in FIG. 14 on an SDR image;

FIG. 17 is a diagram describing a relationship between a master, a distributing system, and the display device at a time of introducing HDR;

FIG. 20 is a diagram illustrating a display process for converting the HDR signal and generating an HDR video in HDRTV;

FIG. 21 is a diagram illustrating algorithm at a time of a luminance converting process;

FIG. 26A is a diagram illustrating one example of the result of acquiring the HDR image obtained by the mastering of FIG. 19A and performing luminance conversion for the display unit whose maximum luminance value is 500 nit;

Figure 1:
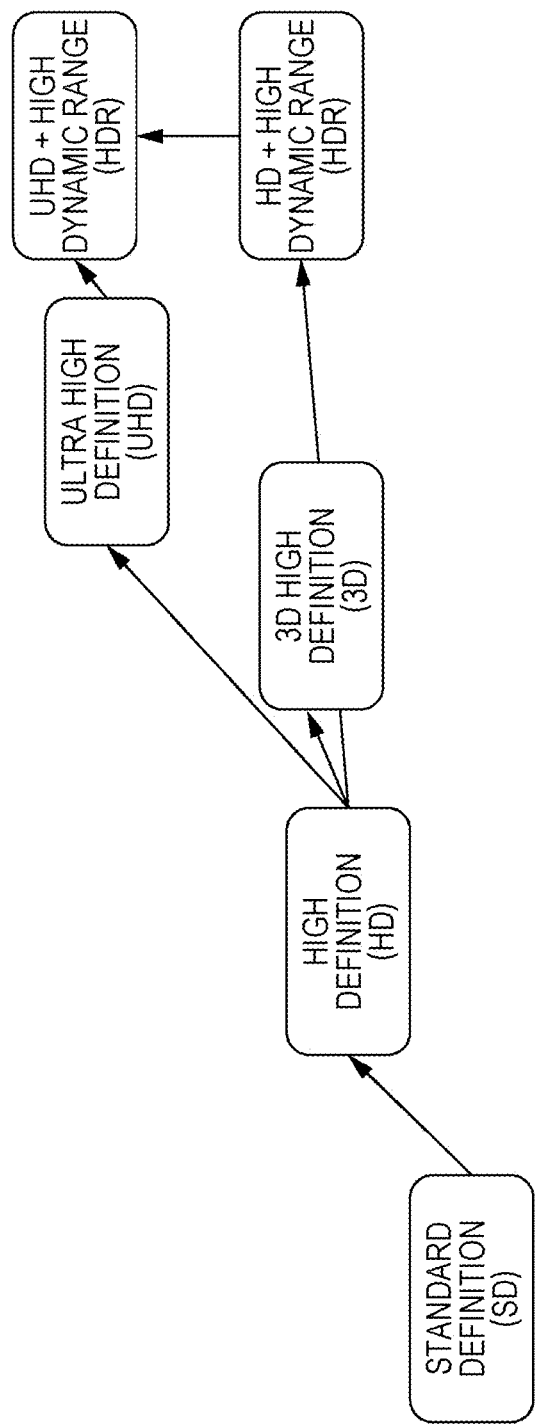
FIG. 1 is a diagram describing improvement of a video technique.

DESCRIPTION OF EMBODIMENTS (Underlying Knowledge Forming Basis of the Present Disclosure)

The inventors of the present invention found that an image signal processing apparatus described in "Background Art" has the following problems.

In the image signal processing apparatus disclosed in PTL 1, linear luminance for respective pixels is calculated based on linear RGB values calculated from the respective pixels forming an object, correction linear luminance for the respective pixels and a correction linear RGB value of a synthesized pixel obtained by synthesizing a plurality of pixels including the respective pixels are calculated based on the linear RGB value and the linear luminance, and the correction linear luminance and the correction linear RGB value are gamma-corrected so that display luminance and a display RGB value are calculated. In such a manner, in the image signal processing apparatus, the linear luminance is corrected based on the correction linear RGB value so that displayable gradation is increased.

However, in correction (conversion) of luminance of the image signal processing apparatus disclosed in PTL 1, a luminance converting method at a time of correcting (converting) the luminance from a first luminance range into a second luminance range smaller than the first luminance range is not considered.

In accordance with the above consideration, the inventors of the present invention have examined the following improvement plan in order to solve the above problem.

From one aspect of the present disclosure, a display method for converting luminance of an input video in order to display the video on a display device, includes acquiring a first luminance signal indicating a first luminance value of the video in a first luminance range where a maximum luminance value is defined as a first maximum luminance value that exceeds 100 nit, the luminance of the video being formed by the first luminance value, selecting a luminance converting process to be executed from among a plurality of luminance converting processes based on a reference luminance value corresponding to reference reflectance included in first meta data of the acquired first luminance signal, and converting the first luminance value indicated by the acquired first luminance signal into a second luminance value corresponding to a second luminance range where the maximum luminance value is defined as a second maximum luminance value that is smaller than the first maximum luminance value and larger than 100 nit based on the selected luminance converting process.

As a result, the luminance converting process is switched so that the luminance conversion is performed, in response to the reference luminance value corresponding to the reference reflectance, and thus the luminance can be suitably converted.

Further, for example, in the selecting, the luminance converting process may be selected based on whether the reference luminance value is a first reference value.

Further, for example, in the converting, when the reference luminance value is the first reference value, the first luminance value indicated by the first luminance signal, which indicates a luminance value not more than a second reference value larger than the first reference value, is decided as the second luminance value. In a case of the first luminance signal indicating a luminance value exceeding the second reference value, the first luminance value in a range from the second reference value to the first maximum luminance value is subjected to linear conversion where the first maximum luminance value is made to correspond to the second maximum luminance value displayable in the display device so that the first luminance value may be converted into the second luminance value.

Further, for example, in the converting, at least in a case of the first luminance signal indicating the luminance value that is the second reference value or less, a minimum luminance value that is displayable in the display device and is included in second meta data indicating a display characteristic of the display device is added to a value after the linear conversion so that the obtained value after the addition may be decided as the second luminance value.

Further, for example, in the converting, when the reference luminance value is the first reference value, the first luminance value indicated by the first luminance signal, which indicates the luminance value not more than the second maximum luminance value displayable in the display device, is decided as the second luminance value, so that the second maximum luminance value may be decided as the second luminance value with respect to the first luminance value indicated by the first luminance signal, which indicates the luminance value exceeding the second maximum luminance value.

Further, for example, in the converting, when the reference luminance value is a third reference value different from the first reference value, the first luminance value indicated by the first luminance signal, which indicates a luminance value not more than a fourth reference value larger than the third reference value, is decided as the second luminance value. In a case of the first luminance signal indicating a luminance value exceeding the fourth reference value, the first luminance value in a range from the fourth reference value to the second maximum luminance value displayable in the display device is subjected to linear conversion where the first maximum luminance value is made to correspond to the second maximum luminance value so that the first luminance value may be converted into the second luminance value.

Further, for example, in the converting, when the reference luminance value is the first reference value, the first luminance value indicated by the first luminance signal, which indicates a luminance value not more than a second reference value larger than the first reference value, is decided as the second luminance value, and in a case of the first luminance signal indicating a luminance value exceeding the second reference value, the first luminance value in a range from the second reference value to the first maximum luminance value is subjected to linear conversion where the first maximum luminance value is made to correspond to the second maximum luminance value displayable in the display device so that the first luminance value is converted into the second luminance value. In the luminance conversion, the reference luminance value is a third reference value different from the first reference value, the first luminance value indicated by the first luminance signal, which indicates a luminance value not more than a fourth reference value larger than the third reference value, is decided as the second luminance value. In a case of the first luminance signal indicating a luminance value exceeding the fourth reference value, the first luminance value in a range from the fourth reference value to the second maximum luminance value displayable in the display device is subjected to linear conversion where the first maximum luminance value is made to correspond to the second maximum luminance value so that the first luminance value is converted into the second luminance value, and the second reference value and the fourth reference value may be luminance values corresponding to reflectance larger than the reference reflectance.

Further, for example, in the converting, when the reference luminance value is a third reference value different from the first reference value, the first luminance value indicated by the first luminance signal, which indicates the luminance value not more than the second maximum luminance value displayable in the display device, is decided as the second luminance value, and the second maximum luminance value may be decided as the second luminance value with respect to the first luminance value indicated by the first luminance signal, which indicates the luminance value exceeding the second maximum luminance value.

Further, for example, in the converting, when the reference luminance value is a third reference value different from first reference value, as to the first luminance signal indicating a luminance value not more than a fourth reference value larger than the third reference value, the first luminance value is converted into the second luminance value in response to a ratio between the first reference value and the third reference value. As to the first luminance signal indicating a luminance value exceeding the third reference value, the first luminance value in a range from the fourth reference value to the first maximum luminance value is subjected to linear conversion where the first maximum luminance value is made to correspond to a second maximum luminance value displayable in the display device so that the first luminance value may be converted into the second luminance value.

Further, for example, in the converting, when the reference luminance value is a third reference value different from first reference value, as to the first luminance signal indicating a luminance value not more than a fourth reference value larger than the third reference value, the first luminance value is converted into the second luminance value in response to a ratio between the first reference value and the third reference value. As to the first luminance signal indicating a luminance value between the fourth reference value and a fifth reference value larger than the fourth reference value, the first luminance value in a range from the fourth reference value to the fifth reference value is subjected to linear conversion where the fifth reference value is made to correspond to the second maximum luminance value displayable in the display device so that the first luminance value may be converted into the second luminance value. As to the first luminance signal indicating a luminance value exceeding the fifth reference value, the second maximum luminance value may be decided as the second luminance value.

Further, for example, second meta data indicating a display characteristic of the display device is acquired from the display device, and in the selection, the luminance converting process is selected based on the acquired second meta data so that the first luminance value may be converted into the second luminance value by the switched luminance converting process.

Further, for example, the second meta data may be data indicating a viewing environment or a display mode of the display device.

Further, for example, in a reproduction stream to be sequentially reproduced based on the first luminance signal, when the reference luminance value corresponding to the reference reflectance indicated by meta data of the first meta data of the first luminance signal differs between a first zone and a second zone of the reproduction stream, in the luminance conversion, the first luminance value may be converted into the second luminance value according to the reference luminance values associated with the first zone and the second zone.

These generic or specific modes may be realized by an apparatus, a system, an integrated circuit, a computer program or a recording medium such as CD-ROM readable by a computer, or may be realized by any combination of the system, a method, the integrated circuit, the computer program and the recording medium.

The converting method and a converting apparatus according to one mode of the present disclosure are specifically described below with reference to the accompanying drawings.

Exemplary embodiments to be described below are specific examples of the present disclosure. Numerical values, shapes, materials, disposed positions and connecting forms of components, steps and an order of steps to be described below in the exemplary embodiments are examples, and are not intended to limit the present disclosure. Further, some of the components that are not described in independent claims indicating a generic concept are described as optional components in the exemplary embodiment.

First Exemplary Embodiment

The present disclosure relates to an HDR signal format, and a converting method and a converting apparatus for an HDR, the HDR (High Dynamic Range) signal being a high-luminance signal in a high luminance range. They are for realizing display of the HDR signal on a display device having a display ability in a luminance range different from a maximum luminance value (a maximum luminance value or a peak luminance value) in the luminance range associated with the HDR signal (for example, TV, a projector, a tablet, or a smartphone).

[1-1. Background]

Video technical transition is described with reference to FIG. 1. FIG. 1 is a diagram describing evolution of the video technique.

In heightening of video quality, emphasis is put on an increase of display pixels, and a video with Standard Definition (SD) of 720×480 pixels to a so-called 2K video with High Definition (HD) of 1920×1080 pixels is in widespread use.

In recent years, in order to further heighten the image quality, a video with Ultra High Definition (UHD) of 3840× 1920 pixels or a so-called 4K video of 4096×1920 pixels are started to be introduced.

It is considered that along with heightening the video definition by introducing 4K, a dynamic range is widened, color gamut is extended, or a frame rate is added and improved so that the video definition is heightened.

As to High dynamic range, an increase in performance of a digital camera or a CMOS (Complementary metal-oxide- semiconductor) image sensor enables photography of an image in a wide dynamic range whose Stop number indicating exposure is 14 Stops or more. For this reason, dark part gradation is maintained, and simultaneously light brighter than 100% reflection light (bright light such as specular reflected light) can be imaged. In order to apply the increase in the camera or image sensor performance to an increase in an expressive power, an attention is paid to HDR (High Dynamic Range) as signal standards that enable transmission of a higher luminance signal.

A conventional TV signal is called an SDR (Standard Dynamic Range) signal, and its maximum luminance value is 100 nit, but it is assumed that a maximum luminance value of HDR is increased to 1000 nit or more. Mastering display standards are being standardized for HDR in SMPTE (Society of Motion Picture & Television Engineers) or ITU-R (International Telecommunications Union Radio communications Sector).

As to a specific application destination of HDR, similarly to HD or UHD, it is assumed that HDR is used in broadcast and package media (such as Blu-ray (registered trade name, hereinafter simply Blu-ray) Disc), and Internet delivery.

Hereinafter, in a video compatible with HDR, luminance of the video includes luminance values in an HDR luminance range where the maximum luminance value is defined to a first maximum luminance value exceeding 100 nit, and a luminance signal indicating the luminance value of the video is called an HDR signal. In a video compatible with SDR, a luminance of the video includes luminance values in an SDR luminance range, and a luminance signal indicating the luminance value of the video is called an SDR signal. Further, the HDR luminance range is a luminance range whose maximum luminance value is larger than a maximum luminance value in SDR luminance range. A minimum luminance value in the HDR luminance range is 0 nit that is equal to a minimum luminance value in the SDR luminance range.

[1-2. SDRTV]

Normally, an input signal with luminance values of up to 100 nit is input into TV (hereinafter, "SDRTV") that copes only with display of a video compatible with SDR (hereinafter, "SDR display"). For this reason, in SDRTV, a display capability of 100 nit is enough for expressing a luminance value of an input signal. However, SDRTV actually has a function for reproducing a video of optimum luminance value depending on a viewing environment (a dark room: cinema mode, or bright room: a dynamic mode), and most of SDRTVs have a capability of expressing a video of 200 nit or more. That is to say, such SDRTV selects the display mode appropriate to a viewing environment so as to be capable of displaying a video of up to a maximum luminance of display capability (for example, 300 nit).

Figure 2A:
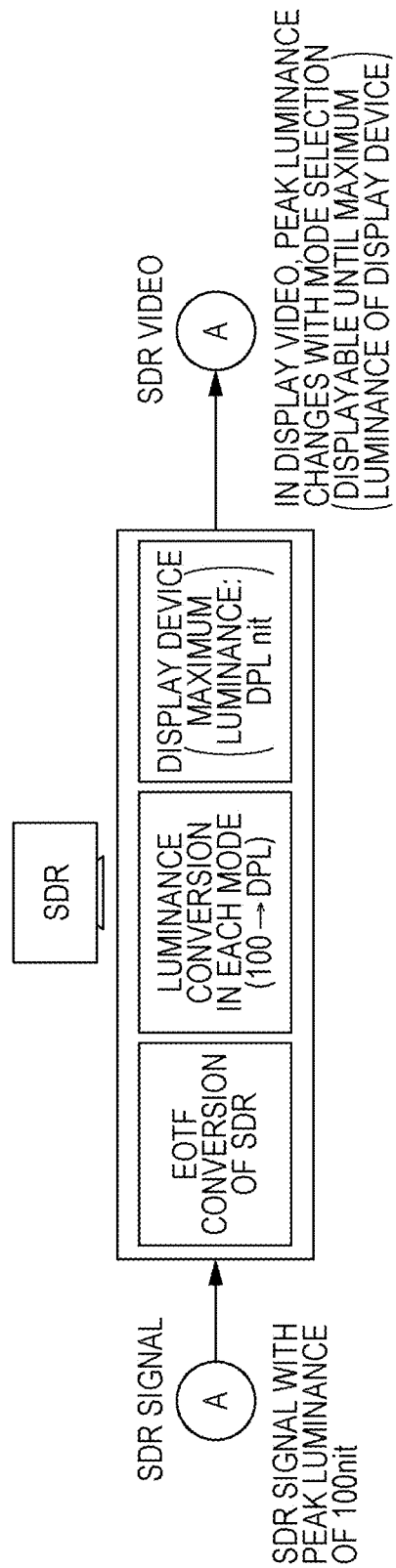
FIG. 2A is a diagram describing an SDR display process in SDRTV.

However, since a luminance upper limit of an SDR type input signal to be input into SDRTV is decided as 100 nit, it is difficult to use a high-luminance video reproducing capability, which exceeds 100 nit, of SDRTV for reproducing an HDR signal as long as an SDR-type input interface is used as in the past (see FIG. 2A and FIG. 2B).

[1-3. With Respect to EOTF]

EOTF is described with reference to FIG. 3A and FIG. 3B.

Figure 3A:
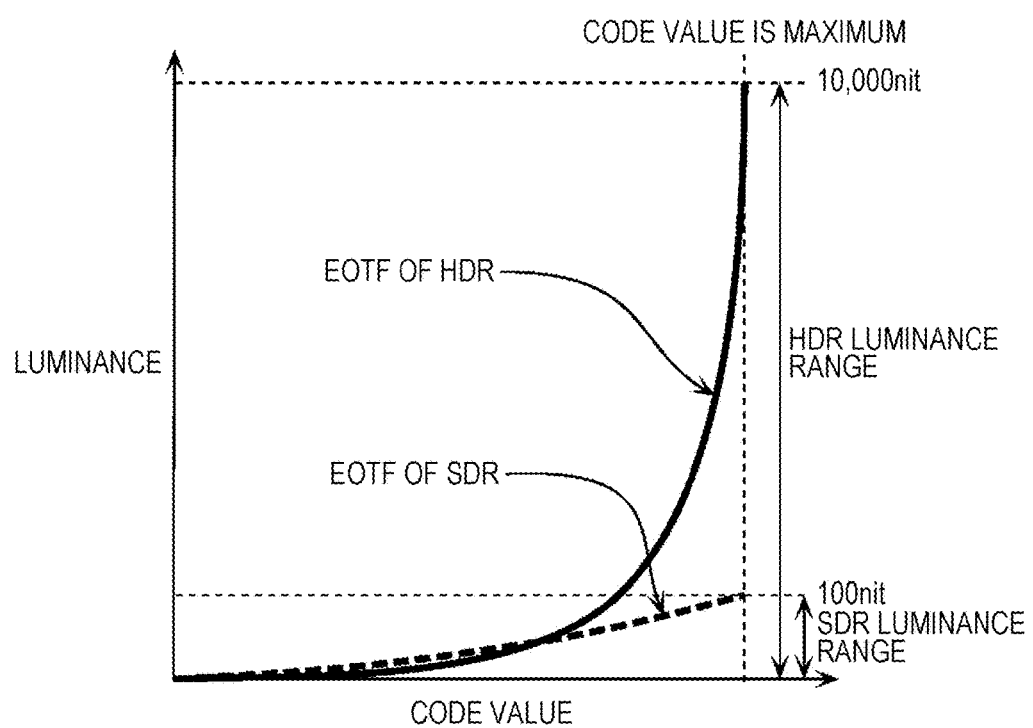
FIG. 3A is a diagram illustrating an example of EOTF (Electro-Optical Transfer Function) compatible with each of HDR and SDR.

FIG. 3A is a diagram illustrating an example of EOTFs (Electro-Optical Transfer Functions) compatible with HDR and SDR, respectively.

EOTF is generally called a gamma curve, indicates association between a code value and a luminance value, and is for converting a code value into a luminance value. That is to say, EOTF is relational information indicating association between a plurality of code values and luminance values.

Figure 3B:
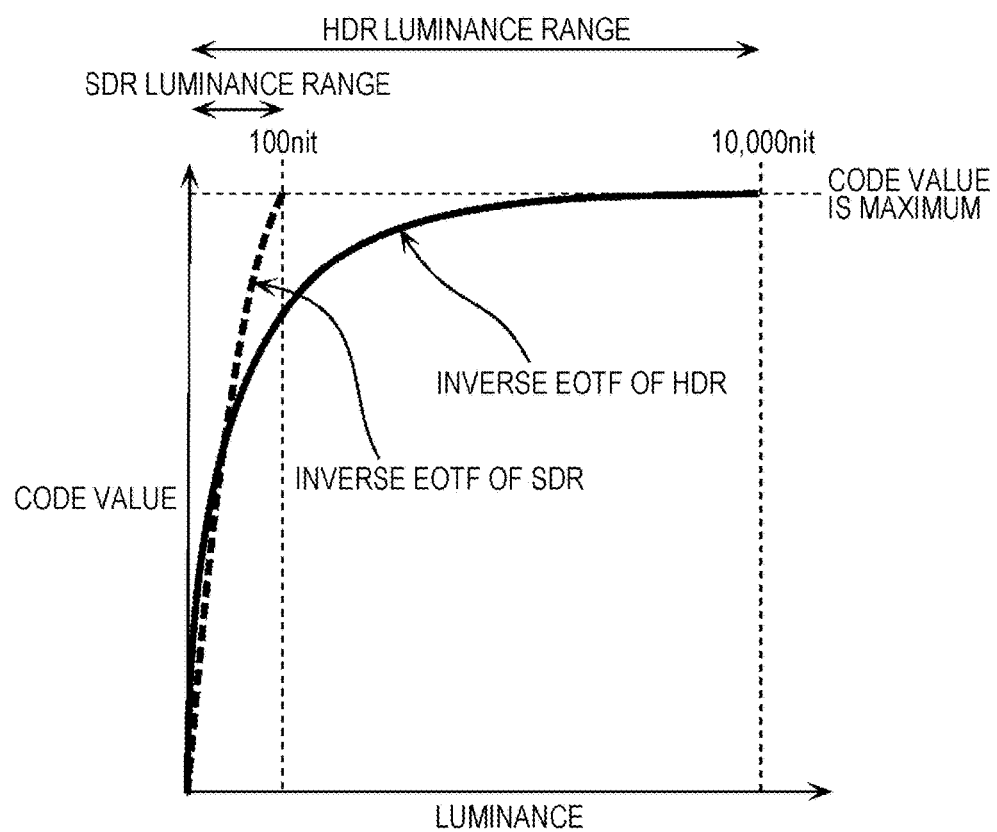
FIG. 3B is a diagram illustrating an example of inverted EOTF compatible with each of HDR and SDR.

Further, FIG. 3B is a diagram illustrating an example of inverse EOTFs related to HDR and SDR, respectively.

Inverse EOTF indicates correspondence between a luminance value and a code value, and for quantizing and converting a luminance value into a code value inversely to EOTF. That is to say, inverse EOTF is relational information indicating the association relationship between the luminance value and a plurality of code values. For example, when a luminance value of an HDR-compatible video is expressed by a code value of 10-bit gradation, and luminance values in the HDR luminance range of up to 10,000 nit are quantized so as to be mapped into 1024 integers from 0 to 1023. That is to say, quantization based on inverse EOTF converts a luminance value in the luminance range of up to 10,000 nit (the luminance value of an HDR-compatible video) into an HDR signal as a 10-bit code value. HDR-compatible EOTF (hereinafter, "HDR EOTF") or HDR-compatible inverse EOTF (hereinafter, "inverse HDR EOTF") enables expression of a luminance value higher than a luminance value in SDR-compatible EOTF (hereinafter, "SDR EOTF") or SDR-compatible inverse EOTF (hereinafter, "inverse SDR EOTF"). For example, in FIG. 3A and FIG. 3B, the maximum luminance value (peak luminance) is 10,000 nit. That is to say, the HDR luminance range includes the entire SDR luminance range, and the peak luminance of HDR is larger than peak luminance of SDR. The HDR luminance range is a luminance range where the maximum value is increased from 100 nit that is the maximum value of the SDR luminance range to 10,000 nit.

For example, HDR EOTF and inverse HDR EOTF include SMPTE 2084 standardized in Society of Motion Picture and Television Engineers (SMPTE) as one example.

[1-4. How to Use EOTF]

FIG. 4 is an explanatory diagram illustrating a method for deciding a code value of a luminance signal to be stored in contents and a process for restoring a luminance value from the code value at a reproduction time.

A luminance signal indicating luminance in this example is an HDR-compatible HDR signal. An image after grading is quantized by inverse HDR EOTF, and a code value corresponding to a luminance value of the image is decided. The image is encoded based on this code value, and a video stream is generated. At a time of reproduction, a decoded result of the stream is inversely quantized based on HDR EOTF so as to be converted into a linear signal and each luminance value for each pixel is restored. Hereinafter, the quantization using inverse HDR EOTF is called "inverse HDR EOTF conversion". The inverse quantization using HDR EOTF is referred to as "HDR EOTF conversion". Similarly, the quantization using inverse SDR EOTF is referred to as "inverse SDR EOTF conversion". The inverse quantization using SDR EOTF is referred to as "SDR EOTF conversion".

[1-5. Necessity of Pseudo HDR]

Necessity of pseudo HDR is described below with reference to FIG. 5A to FIG. 5C.

FIG. 5A is a diagram illustrating one example of a display process for converting an HDR signal in HDRTV to execute HDR display.

As illustrated in FIG. 5A, when an HDR video is displayed, the maximum value in the HDR luminance range (peak luminance (HPL (HDR Peak Luminance): for example, 1500 nit)) cannot be directly displayed in some cases even on a display device that is HDRTV. In this case, a linear signal after the inverse quantization using HDR EOTF is subjected to luminance conversion so as to accord with a maximum value of a luminance range of the display device (peak luminance (DPL (Display Peak luminance): for example, 750 nit)). When a video signal acquired by performing the luminance conversion is input into the display device, an HDR video that accords with the luminance range of the maximum value as a limit of the display device can be displayed.

FIG. 5B is a diagram illustrating one example of a display process for the HDR display using an HDR-compatible reproducing apparatus and SDRTV.

As illustrated in FIG. 5B, when the HDR video is displayed on SDRTV as the display device, "HDR EOTF conversion" performed in HDRTV and "luminance conversion" using DPL (for example: 300 nit) that is a maximum value in the luminance range of SDRTV are performed by "a HDR/pseudo HDR converting process" in an HDR-compatible reproducing apparatus (Blu-ray device) in FIG. 5B utilizing a state that a maximum value of a luminance range of SDRTV (peak luminance (DPL: for example, 300 nit)) exceeds 100 nit. When a signal obtained by performing "luminance conversion" can be directly input into "the display device" of SDRTV, SDRTV can realize an effect that is the same as the effect of HDRTV.

However, since SDRTV does not have means for directly inputting such a signal from an outside, this effect cannot be realized.

Figure 5C:
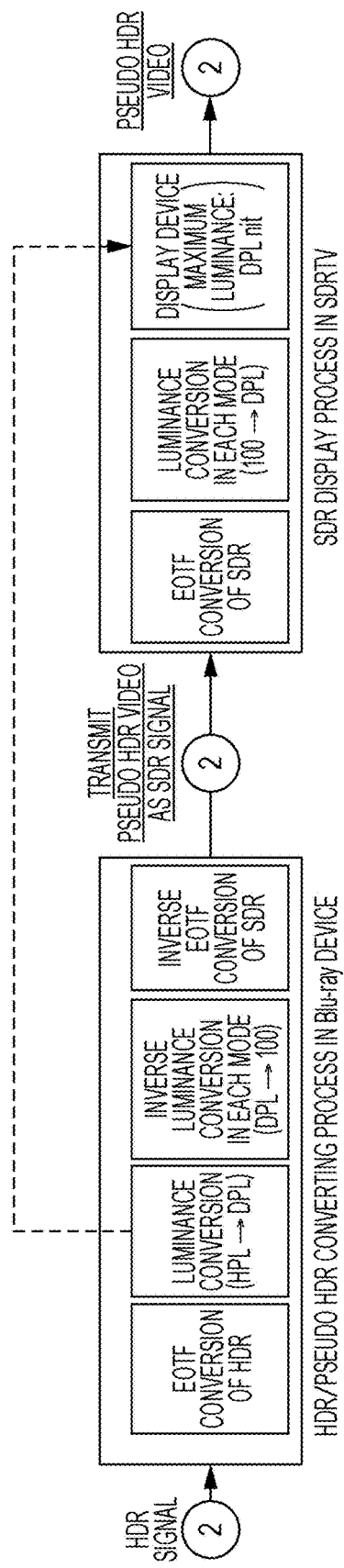
FIG. 5C is a diagram illustrating one example of a display process for the HDR display using the HDR-compatible reproducing apparatus and SDRTV.

FIG. 5C is a diagram illustrating one example of a display process for the HDR display using the HDR-compatible reproducing apparatus and SDRTV that are connected to each other via a standard interface.

As illustrated in FIG. 5C, normally a signal that can provide the effect of FIG. 5B should be input into SDRTV by using an input interface of SDRTV (HDMI (registered trade name, hereinafter simply HDMI)). In SDRTV, the signal input via the input interface sequentially passes through "the SDR EOTF conversion", "the luminance conversion in each mode", and "the display device", and a video that accords with the luminance range of the maximum value of the display device is displayed. For this reason, in an HDR-compatible Blu-ray device, a signal that enables "the SDR EOTF conversion" and "the luminance conversion in each mode" where the signal passes immediately after the input interface in SDRTV to be cancelled (a pseudo HDR signal) is generated. That is to say, in the HDR-compatible Blu-ray device, "inverse luminance conversion in each mode" and "inverse SDR EOTF conversion" are performed immediately after "the HDR EOTF conversion" and "luminance conversion" using peak luminance of SDRTV (DPL), so that the effect that is the same as the effect in the case where the signal immediately after the "luminance conversion" is input into the "display device" (an arrow of a broken line in FIG. 5C) is realized in a pseudo manner.

[1-6. Converting Apparatus and Display Device]

FIG. 6 is a block diagram illustrating a constitution of a converting apparatus and the display device according to the exemplary embodiment. FIG. 7 is a flowchart illustrating a converting method to be performed by the converting apparatus and a display method to be performed by the display device according to the exemplary embodiment.

As illustrated in FIG. 6, converting apparatus 100 includes EOTF converter for HDR 101, luminance converter 102, inverse luminance converter 103, and inverse EOTF converter for SDR 104. Further, display device 200 includes display setter 201, EOTF converter for SDR 202, luminance converter 203, and display 204.

Details of components of converting apparatus 100 and display device 200 are described in description of the converting method and the display method.

Hereinafter, the HDR luminance range (0 to HPL [nit]) is referred to as "first luminance range". A display luminance range (0 to DPL [nit]) is referred to as "second luminance range". The SDR luminance range (0 to 100 [nit]) is referred to as "third luminance range".

[1-7. Converting Method and Display Method]

The converting method to be performed by converting apparatus 100 is described with reference to FIG. 7. The converting method includes step S101 to step S104 described below.

EOTF converter for HDR 101 in converting apparatus 100 acquires an HDR video that has been subjected to inverse HDR EOTF conversion. EOTF converter for HDR 101 in converting apparatus 100 performs the EOTF conversion for HDR on an HDR signal of the acquired HDR video (S101). As a result, EOTF converter for HDR 101 converts the acquired HDR signal into a linear signal indicating a luminance value. An example of HDR EOTF is SMPTE 2084.

Luminance converter 102 of converting apparatus 100 performs first luminance conversion for converting the linear signal converted by EOTF converter for HDR 101 using display characteristic information and contents luminance information (S102). In the first luminance conversion, a luminance value in the HDR luminance range that is a first luminance range (hereinafter, "a luminance value of HDR") is converted into a luminance value in the display luminance range that is a second luminance range (hereinafter, "display luminance value"). Details are described later.

As a result, EOTF converter for HDR 101 functions as an acquirer that acquires an HDR signal as a first luminance signal indicating a code value obtained by quantizing a video luminance value. Further, EOTF converter for HDR 101 and luminance converter 102 function as a converter that converts a code value indicated by the HDR signal acquired by the acquirer into a display luminance value in the display luminance range as a maximum value (DPL) which is decided based on a luminance range of the display (display device 200), is smaller than a maximum value (HPL) in the HDR luminance range and is larger than 100 nit.

More specifically, in step S101, EOTF converter for HDR 101 decides a luminance value of HDR that is, in HDR EOTF, associated with a code value of HDR as a first code value indicated by the acquired HDR signal using the acquired HDR signal and HDR EOTF. The HDR signal indicates a code value of HDR obtained by quantizing a video (contents) luminance value using inverse HDR EOTF where a luminance value in the HDR luminance range is associated with a plurality of HDR code values.

Further, in step S102, luminance converter 102 decides a display luminance value in the display luminance range associated with the HDR luminance value decided in step S101 in advance, and performs the first luminance conversion for converting the HDR luminance value in the HDR luminance range into the display luminance value in the display luminance range.

Further, before step S102, converting apparatus 100 acquires the contents luminance information including at least one of a maximum value of the video (contents) luminance (CPL: Content Peak luminance) and an average luminance value of the video (CAL: Content Average luminance) as information about the HDR signal. CPL (first maximum luminance value) is, for example, a maximum value in luminance values of a plurality of images forming an HDR video. Further, CAL is, for example, an average luminance value that is an average of luminance values for a plurality of images forming an HDR video.

Further, before step S102, converting apparatus 100 acquires display characteristic information about display device 200 from display device 200. The display characteristic information is information indicating display characteristics of display device 200, such as the maximum luminance value (DPL) to be displayable on display device 200, a display mode of display device 200 (see following description), and input/output characteristics (EOTF compatible with the display device).

Further, converting apparatus 100 may transmit recommended display setting information (see following description, hereinafter, also as "setting information") to display device 200.

Inverse luminance converter 103 of converting apparatus 100 performs inverse luminance conversion corresponding to a display mode of display device 200. As a result, inverse luminance converter 103 performs second luminance conversion for converting a luminance value in the display luminance range as the second luminance range into a luminance value in the SDR luminance range as the third luminance range (S103). Details are described later. That is to say, inverse luminance converter 103 decides a luminance value, which is associated with the display luminance value obtained in step S102 in advance and is in SDR as a third luminance value in the SDR luminance range where a maximum value is 100 nit (hereinafter "SDR luminance value"), and performs the second luminance conversion for converting the display luminance value in the display luminance range into the SDR luminance value in the SDR luminance range.

Inverse EOTF converter for SDR 104 in converting apparatus 100 performs the inverse SDR EOTF conversion so as to generate a pseudo HDR video (S104). That is to say, inverse EOTF converter for SDR 104 quantizes the decided SDR luminance value using inverse EOTF (Electro-Optical Transfer Function) of SDR (Standard Dynamic Range) as a third relational information where the luminance value in the HDR luminance range is associated with a plurality of third code values, decides a third code value obtained by the quantization, and converts the SDR luminance value in the SDR luminance range into an SDR signal as a third luminance signal indicating the third code value so as to generate a pseudo HDR signal. The third code value is a code value related to SDR, and is referred to as "SDR code value" hereinafter. That is to say, the SDR signal is indicated by an SDR code value obtained by quantizing a video luminance value using inverse SDR EOTF where the luminance value in the SDR luminance range is associated with the plurality of SDR code values. Converting apparatus 100 outputs the pseudo HDR signal (the SDR signal) generated in step S104 to display device 200.

Converting apparatus 100 performs the first luminance conversion and the second luminance conversion on the HDR luminance value obtained by performing the inverse quantization on the HDR signal so as to generate an SDR luminance value corresponding to pseudo HDR, and quantizes the SDR luminance value using SDR EOTF so as to generate an SDR signal corresponding to pseudo HDR. The SDR luminance value is a numerical value in the luminance range of from 0 to 100 nit corresponding to SDR, but is converted based on the display luminance range. For this reason, the SDR luminance value is different from the luminance value in the luminance range of from 0 to 100 nit corresponding to SDR obtained by performing the luminance conversion on the HDR luminance value using HDR EOTF and SDR EOTF.

The display method to be performed by display device 200 is described below with reference to FIG. 7. The display method includes step S105 to step S108 described below.

Display setter 201 of display device 200 sets display setting of display device 200 using setting information acquired from converting apparatus 100 (S105). Display device 200 is SDRTV here. The setting information is information indicating recommended display setting for the display device, and is information indicating how to perform EOTF on a pseudo HDR video and setting that enables a beautiful video to be displayed (namely, information for switching the display setting of display device 200 into optimum display setting). The setting information includes, for example, gamma curve characteristics at an output time in the display device, display modes such as a living mode (normal mode) and a dynamic mode, and a numerical value of backlight (brightness). Further, a message that urges a user to change the display setting of display device 200 through a manual operation may be displayed on display device 200 (hereinafter, referred to also as "SDR display"). Details are described later.

Before step S105, display device 200 acquires the SDR signal (the pseudo HDR signal), and setting information indicating display setting recommended for display device 200 to display a video.

Further, display device 200 may acquire the SDR signal (the pseudo HDR signal) before step S106 or after step S105.

EOTF converter for SDR 202 in display device 200, then, performs SDR EOTF conversion on the acquired pseudo HDR signal (S106). That is to say, EOTF converter for SDR 202 performs inverse quantization on the SDR signal (the pseudo HDR signal) using SDR EOTF. As a result, EOTF converter for SDR 202 converts an SDR code value indicated by the SDR signal into the SDR luminance value.

Luminance converter 203 of display device 200 performs luminance conversion corresponding to a display mode set in display device 200. As a result, luminance converter 203 performs third luminance conversion for converting the SDR luminance value in the SDR luminance range (0 to 100 [nit]) into the display luminance value in the display luminance range (0 to DPL [nit]) (S107). Details are described later.

As a result, display device 200 converts the third code value indicated by the SDR signal (the pseudo HDR signal) acquired in step S106 and step S107 into the display luminance value in the display luminance range (0 to DPL [nit]) using the setting information acquired in step S105.

More specifically, in the conversion from the SDR signal (the pseudo HDR signal) into the display luminance value, in step S106, the SDR luminance value associated with the SDR code value indicated by the acquired SDR signal by SDR EOTF using EOTF where the luminance value in the SDR luminance range is associated with the plurality of the third code values.

In the conversion into the display luminance value, in step S107, the display luminance value, which is associated with the decided SDR luminance value in advance and is in the display luminance range, is decided, and the third luminance conversion is performed so that the SDR luminance value in the SDR luminance range is converted into the display luminance value in the display luminance range.

Finally, display 204 of display device 200 displays the pseudo HDR video on display device 200 based on the converted display luminance value (S108).

[1-8. First Luminance Conversion]

Figure 8A:
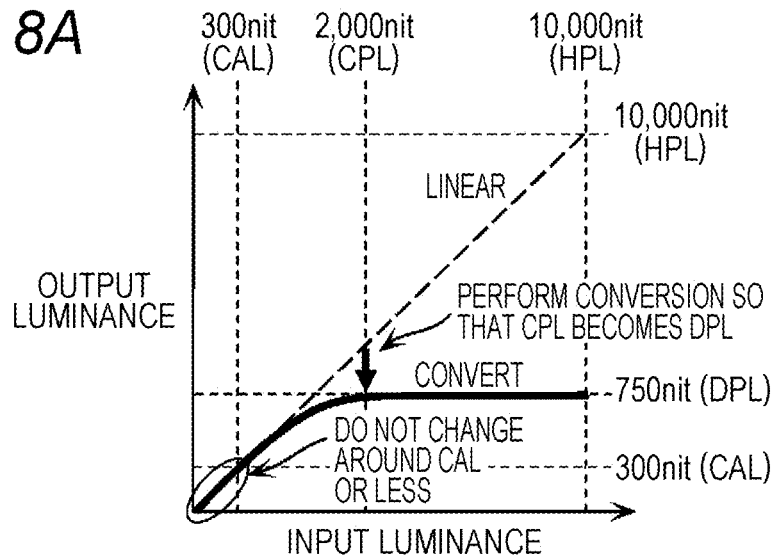
FIG. 8A is a diagram describing one example of first luminance conversion.

The first luminance conversion (from HPL to DPL) in step S102 is described in detail below with reference to FIG. 8A. FIG. 8A is a diagram describing one example of the first luminance conversion.

Luminance converter 102 of converting apparatus 100 performs the first luminance conversion for converting a linear signal (HDR luminance value) obtained in step S101 using the display characteristic information and the contents luminance information about the HDR video. The first luminance conversion allows an HDR luminance value (an input luminance value) to be converted into a display luminance value (an output luminance value) that does not exceed the display peak luminance (DPL). DPL is decided by using maximum luminance a display mode of an SDR display that is the display characteristic information. The display mode is mode information such as a theater mode for dark display on the SDR display and a dynamic mode for bright display. When, for example, the maximum luminance of the SDR display is 1,500 nit, and the display mode provides brightness that is 50% of the maximum luminance, DPL is 750 nit. DPL (the second maximum luminance value) is the maximum luminance value that can be displayed in the display mode currently set in the SDR display. That is to say, in the first luminance conversion, DPL as the second maximum luminance value is decided using the display characteristic information that is information indicating the display characteristics of the SDR display.

Further, in the first luminance conversion, the luminance values that are CAL or less are equal to each other before and after conversion but only the luminance values around CPL or more are changed by using CAL and CPL in the contents luminance information. That is to say, as illustrated in FIG. 8A, in the first luminance conversion, when the HDR luminance value is CAL or less, the HDR luminance value is not converted, the HDR luminance value is decided as the display luminance value, and when the HDR luminance value is CPL or more, DPL as the second maximum luminance value is decided as the display luminance value.

Further, in the first luminance conversion, when the HDR luminance value is CPL, DPL is decided as the display luminance value by using the peak luminance (CPL) of the HDR video in the luminance information.

Figure 8B:
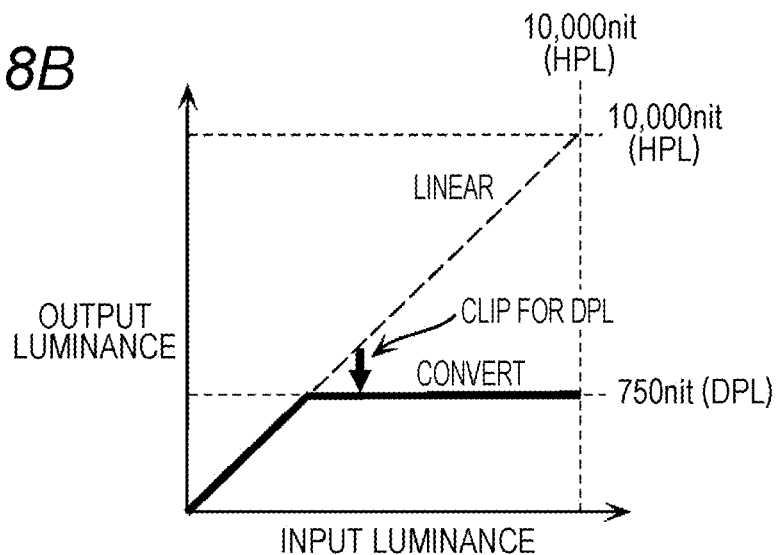
FIG. 8B a diagram describing another example of the first luminance conversion.

In the first luminance conversion, as illustrated in FIG. 8B, the linear signal (HDR luminance value) obtained in step S101 may be converted so as to be clipped to a value that does not exceed DPL. Such luminance conversion enables the process in converting apparatus 100 to be simplified, so that the apparatus is miniaturized, power consumption is reduced, and the process is sped up. FIG. 8B is a diagram describing another example of the first luminance conversion.

[1-9. Second Luminance Conversion]

Figure 9:
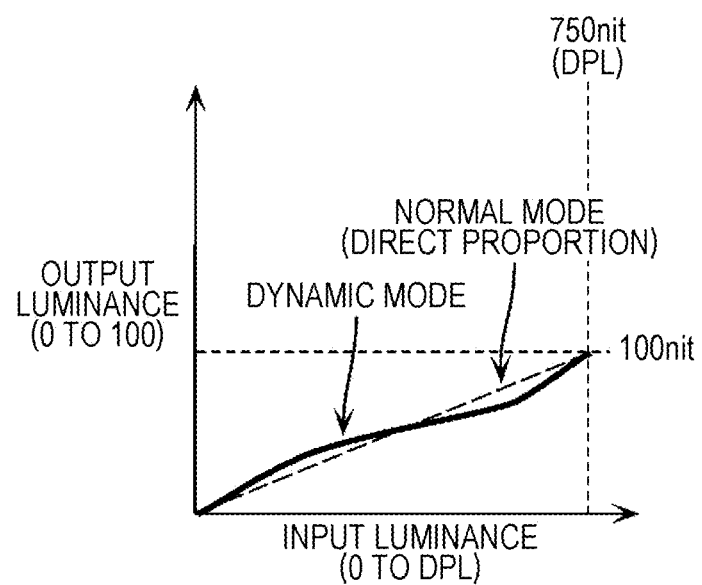
FIG. 9 is a diagram describing second luminance conversion.

Details of the second luminance conversion (from DPL into 100 [nit]) in step S103 are described below with reference to FIG. 9. FIG. 9 is a diagram describing the second luminance conversion.

Inverse luminance converter 103 of converting apparatus 100 performs inverse luminance conversion on the display luminance value in the display luminance range (0 to DPL [nit]) converted by the first luminance conversion in step S102 based on the display mode. The inverse luminance conversion is a process that enables a display luminance value in the display luminance range (0 to DPL [nit]) after step S102 to be acquired when the luminance converting process (step S107) is executed in response to the display mode of the SDR display. That is to say, the second luminance conversion is inverse luminance conversion of the third luminance conversion.

Through the above process, the second luminance conversion makes the display luminance value (the input luminance value) in the display luminance range as the second luminance range be converted into the SDR luminance value (the output luminance value) in the SDR luminance range as the third luminance range.

In the second luminance conversion, a converting system is switched by the display mode of the SDR display. For example, when the display mode of the SDR display is the normal mode, luminance conversion is performed into a direct proportional value that is directly proportional to a display luminance value. Further, in the second luminance conversion, when the display mode of the SDR display is the dynamic mode whose high luminance pixels are brighter and whose low luminance pixels are darker than the pixels in the normal mode, luminance conversion is performed by using an inverse function of this mode, so that an SDR luminance value of the low luminance pixels is made to be a value higher than a direct proportional value directly proportional to the display luminance value and an SDR luminance value of the high luminance pixels is made to be a value lower than the direct proportional value directly proportional to the display luminance value. That is to say, in the second luminance conversion, the luminance value corresponding to the display luminance value decided in step S102 is decided as the SDR luminance value by using luminance related information that accords with the display characteristic information as the information indicating the display characteristics of the SDR display, and the luminance converting process is switched in response to the display characteristic information. The luminance related information that accords with display characteristic information is, for example as illustrated in FIG. 9, information where the display luminance value (the input luminance value) and the SDR luminance value (the output luminance value) are associated with each other. The input luminance value and the output luminance value are set in each display parameter (each display mode) of the SDR display.

[1-10. Display Setting]

Figure 10:
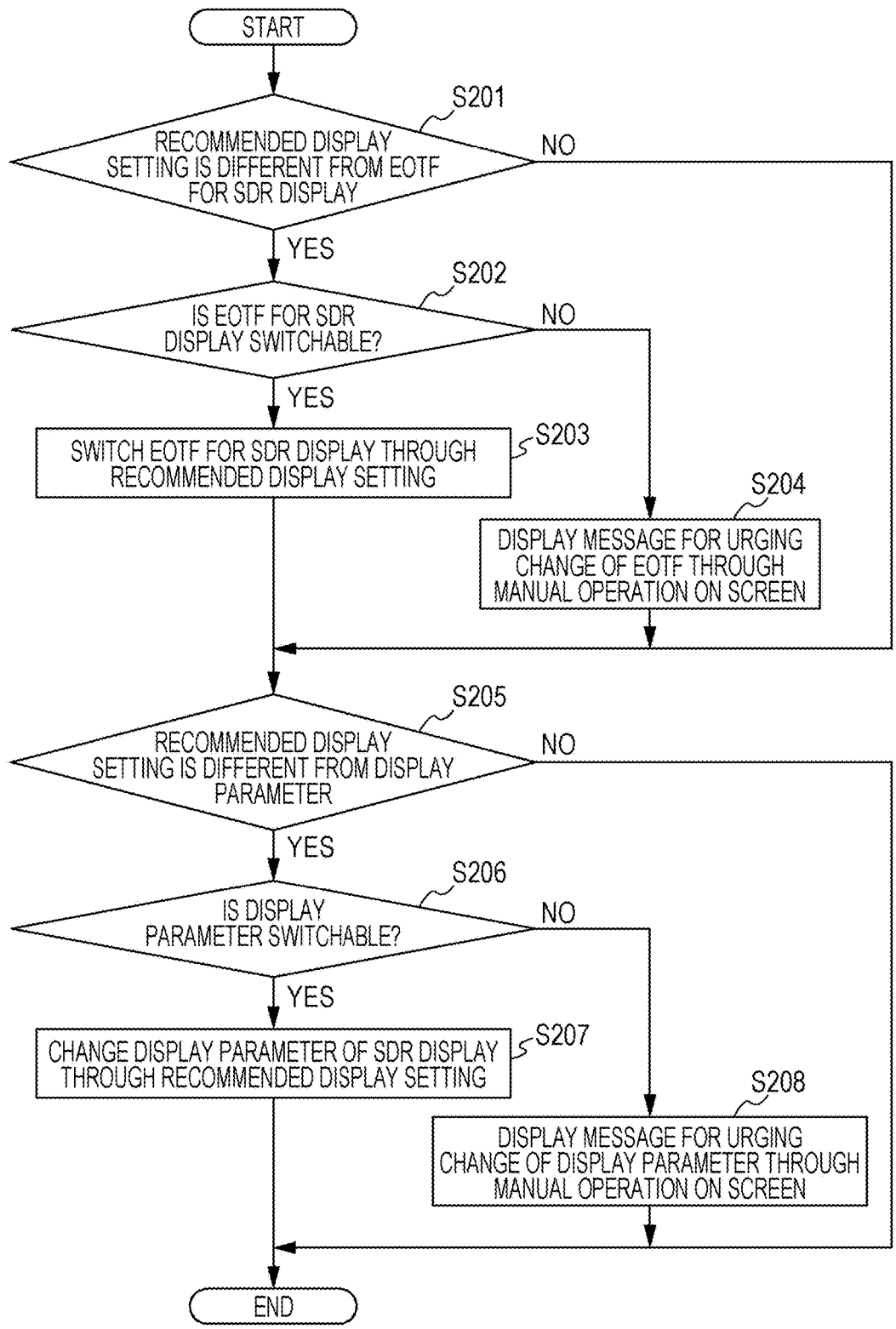
FIG. 10 is a flowchart illustrating a detailed process for display setting.

Details of the display setting in step S105 are described below with reference to FIG. 10. FIG. 10 is a flowchart illustrating a detailed process for display setting.

Display setter 201 of the SDR display executes the process of step S201 to step S208 in step S105.

Display setter 201 determines whether EOTF (EOTF for the SDR display) set in the SDR display matches with EOTF assumed at a time of generating a pseudo HDR video (a SDR signal) using the setting information (S201).

When determining that EOTF set in the SDR display is different from EOTF (EOTF compatible with the pseudo HDR video) indicated by the setting information (Yes in S201), display setter 201 determines whether EOTF for the SDR display can be switched on a system side (S202).

When determining that EOTF can be switched, display setter 201 switches EOTF for the SDR display into suitable EOTF by using the setting information (S203).

In the display setting (S105), EOTF set in the SDR display is set to recommended EOTF according to the acquired setting information in step S201 to step S203. Further, as a result, in step S106 executed after step S105, the SDR luminance value can be decided by using recommended EOTF.

When the determination is made that switching is not enabled on the system side (No in S202), a message for urging the user to manually switch EOTF is displayed on a screen (S204). For example, a message saying "Set the display gamma to 2.4" is displayed on the screen. That is to say, EOTF set in the SDR display cannot be switched in the display setting (S105), display setter 201 displays a message for urging the user to switch EOTF set in the SDR display (EOTF for the SDR display) into recommended EOTF on the SDR display.

The SDR display shows the pseudo HDR video (the SDR signal), but it is determined whether display parameters of the SDR display match with the setting information before display by using the setting information (S205).

When determining that the display parameters set in the SDR display are different from the setting information (Yes in S205), display setter 201 determines whether the display parameters of the SDR display can be switched (S206).

When display setter 201 determines that the display parameter of the SDR display can be switched (Yes in S206), it switches the display parameter of the SDR display according to the setting information (S207).

In the display setting (S105), the display parameter set in the SDR display is set to a recommended display parameter according to the acquired setting information in step S204 to step S207.

When the determination is made that the switching is not enabled on the system side (No in S206), a message that urges the user to change the display parameter set in the SDR display through a manual operation is displayed on the screen (S208). For example, a message saying "set the display mode to the dynamic mode and maximize the backlight" is displayed on the screen. That is to say, in the setting (S105), when the display parameter set in the SDR display cannot be switched, a message that urges the user to switch the display parameter set in the SDR display into a recommended display parameter is displayed on the SDR display.

[1-11. Third Luminance Conversion]

Figure 11:
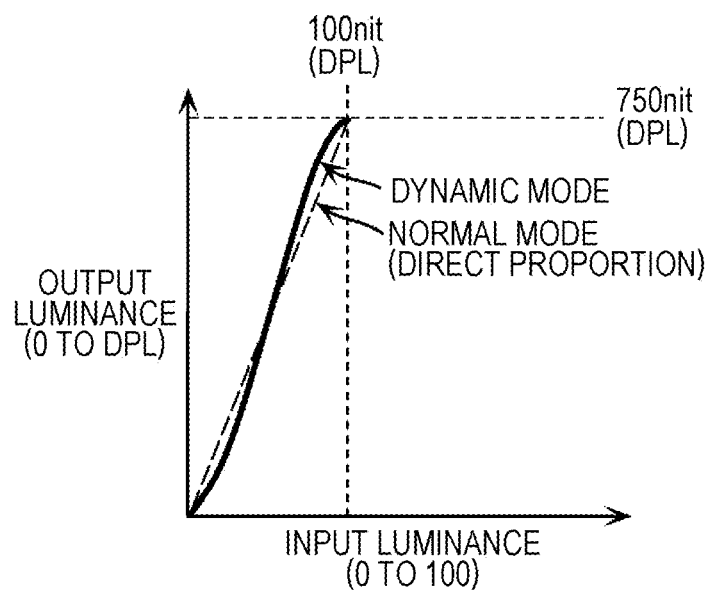
FIG. 11 is a diagram describing third luminance conversion.

Details of the third luminance conversion (100 into DPL [nit]) in step S107 are described below with reference to FIG. 11. FIG. 11 is a diagram describing the third luminance conversion.

Luminance converter 203 of display device 200 converts the SDR luminance value in the SDR luminance range (0 to 100 [nit]) into (0 to DPL [nit]) according to the display mode set in step S105. The process is executed to be an inverse function of the inverse luminance conversion in each mode in S103.

In the third luminance conversion, a converting system is switched by the display mode of the SDR display. For example, when the display mode of the SDR display is the normal mode (namely, the set display parameter is compatible with the normal mode), the display luminance value is subjected to the luminance conversion so as to be a direct proportional value directly proportional to the SDR luminance value. Further, in the third luminance conversion, when the display mode of the SDR display is the dynamic mode where high luminance pixels are brighter and low luminance pixels are darker than the pixels in the normal mode, luminance conversion is performed so that a display luminance value of the low luminance pixels is made to be a value lower than a direct proportional value directly proportional to the SDR luminance value, and a display luminance value of the high luminance pixels is made to be a value higher than the direct proportional value directly proportional to the SDR luminance value. That is to say, in the third luminance conversion, a luminance value associated with the SDR luminance value decided in step S106 in advance is decided as the display luminance value by using luminance related information corresponding to the display parameter indicating the display setting of the SDR display, and the luminance converting process is switched in response to the display parameter. The luminance related information that accords with the display parameter is, for example as illustrated in FIG. 11, information where the SDR luminance value (the input luminance value) and the display luminance value (the output luminance value) are associated with each other. The input luminance value and output luminance value are set in each display parameter (the display mode) of the SDR display.

[1-12. Effects]

An input signal of normal SDRTV is 100 nit, but SDRTV has an ability of the video expression of 200 nit or more depending on a viewing environment (dark room: cinema mode, bright room: dynamic mode). However, since a luminance upper limit of the input signal to SDRTV is decided as 100 nit, the ability cannot be directly used.

When an HDR video is displayed on SDRTV, a "HDR/pseudo HDR converting process" is executed so that the HDR video is not converted into an SDR video of 100 nit or less but gradation of the luminance range that exceeds 100 nit is maintained to a certain extent by using a condition that the peak luminance of SDRTV exceeds 100 nit (normally 200 nit or more). For this reason, a pseudo HDR video close to an original HDR can be displayed on SDRTV.

Figure 12:
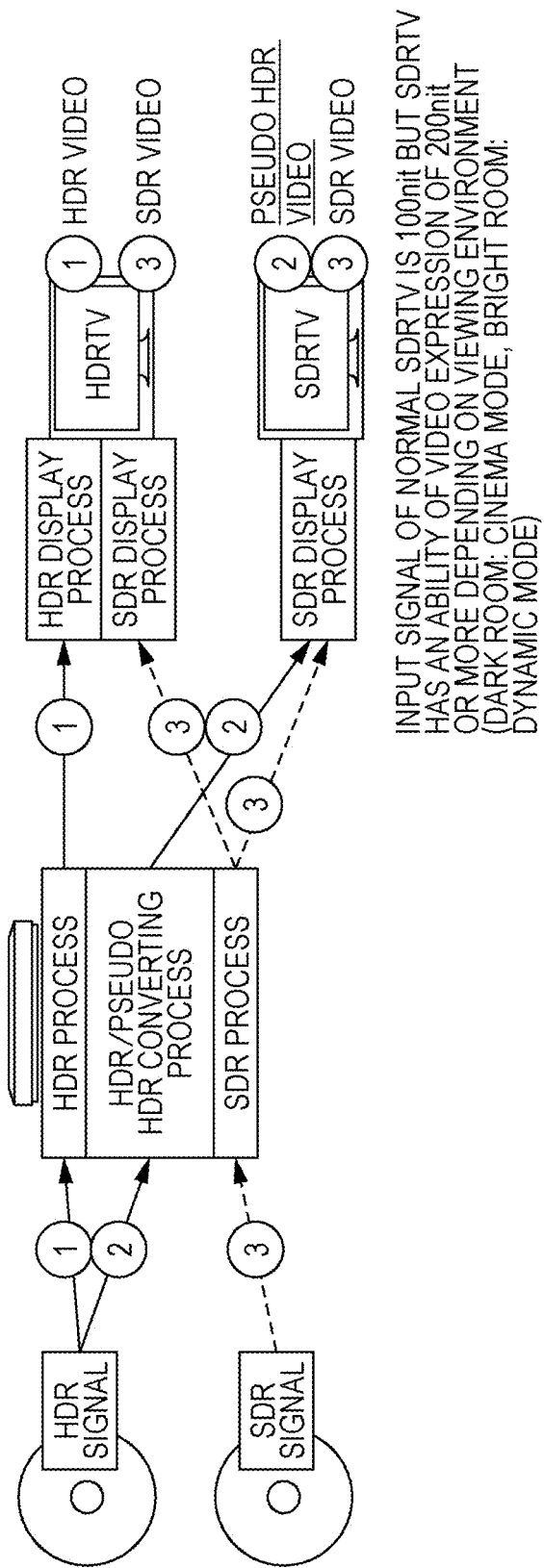
FIG. 12 is a diagram describing a process for converting from HDR to pseudo HDR.

When the technique of the "HDR/pseudo HDR converting process" is applied to Blu-ray, as illustrated in FIG. 12, only the HDR signal is stored in an HDR disc, and when SDRTV is connected to a Blu-ray device, the Blu-ray device executes the "HDR/pseudo HDR converting process". The Blu-ray device, then, converts the HDR signal into the pseudo HDR signal so as to transmit the pseudo HDR signal to SDRTV. As a result, SDRTV converts the received pseudo HDR signal into a luminance value so as to be capable of displaying a video having a pseudo HDR effect. Even when an HDR-compatible TV is not present, an HDR-compatible BD and an HDR-compatible Blu-ray device are prepared so as to be capable of displaying a pseudo HDR video having higher quality than an SDR video even on SDRTV.

Therefore, it is considered that an HDR-compatible TV is necessary for viewing an HDR video, but a pseudo HDR video that provides an HDR-like effect can be viewed on existent SDRTV. As a result, a widespread use of an HDR-compatible Blu-ray can be expected.

The HDR signal that is transmitted by broadcast, package media such as Blu-ray, and Internet delivery such as OTT is subjected to the HDR/pseudo HDR converting process so as to be converted into the pseudo HDR signal. As a result, the HDR signal can be displayed as a pseudo HDR video on existent SDRTV.

Second Exemplary Embodiment

A second exemplary embodiment is described below.

The second exemplary embodiment describes details of the converting method to be performed in the display process for converting the HDR signal to perform HDR display in HDRTV described with reference to FIG. 5A in the first exemplary embodiment. That is to say, the second exemplary embodiment describes details of the luminance converting process for matching a linear signal after inverse quantization using HDR EOTF with the maximum value in the HDRTV luminance range (DPL) even when the display device is HDRTV but the maximum value in the HDR luminance range cannot be displayed directly on HDRTV as described with reference to FIG. 5A.

In the luminance converting process, the luminance converting process to be executed is switched in response to the reference luminance value corresponding to the reference reflectance included in first meta data of the HDR signal as the acquired first luminance signal, and the HDR luminance value is converted into the display luminance value through the switched luminance converting process.

The reference reflectance is described in detail below.

2-1. How to Define Criterion of Luminance at Time of Image Photography

Figure 13:
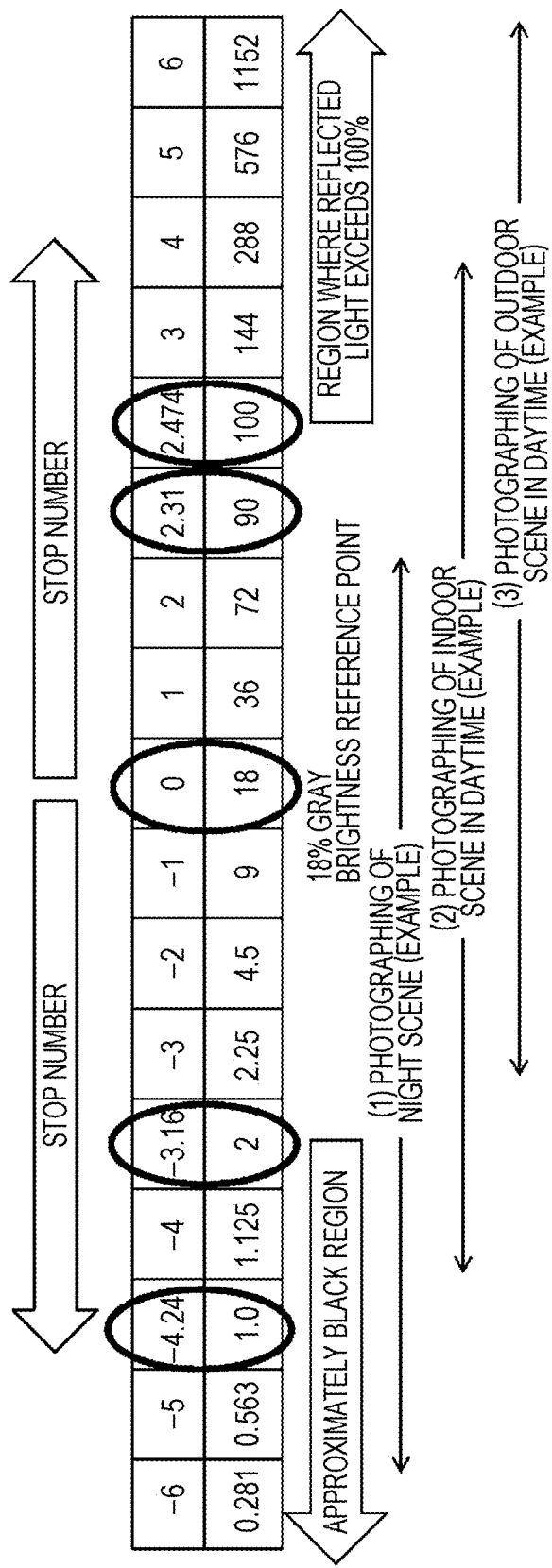
FIG. 13 is a diagram illustrating criterion of luminance at a time of image photographing.

FIG. 13 is a diagram illustrating criterion of luminance at a time of image photography.

As illustrated in FIG. 13, an image is photographed by a camera using 18% gray where reflectance is 18% as a reference point of brightness. That is to say, 18% gray is the reference reflectance to be a reference of the brightness. As to a Stop number, a luminance value in 18% gray is used as a reference point, and the Stop number is defined to increase by one every time when the luminance value is doubled.

The luminance value that is obtained from an image sensor such as CMOS at a time of actually photographing an image using the camera changes according to exposure such as setting of a diaphragm, a shutter speed and sensitivity. That is to say, the luminance value obtained from the image sensor varies according to exposure even when portions of the same luminance are photographed by the camera. For this reason, the Stop number is not an absolute value but a relative value. That is to say, luminance cannot be expressed by the Stop number.

For example, when a night scene is photographed as illustrated in (1) of FIG. 13, in order to prevent black crushing, the exposure is set in the camera by decreasing the shutter speed and opening the diaphragm so that gradation of a dark portion is allowed to remain and gradation of a bright portion is removed.

Further, when an indoor scene in the daytime illustrated in (2) of FIG. 13 is photographed, the exposure is set in the camera so that a dark portion balances with a bright portion. Further, when an outdoor scene in the daytime illustrated in (3) of FIG. 13 is photographed, the exposure is set in the camera so that the exposure is decreased in order to prevent whiteout.

In order to convert the relative luminance value obtained in such a manner into an absolute luminance value, a correlation with respect to 18% gray should be calculated.

2-2. Luminance Value at Time of Photographing Image

Figure 14:
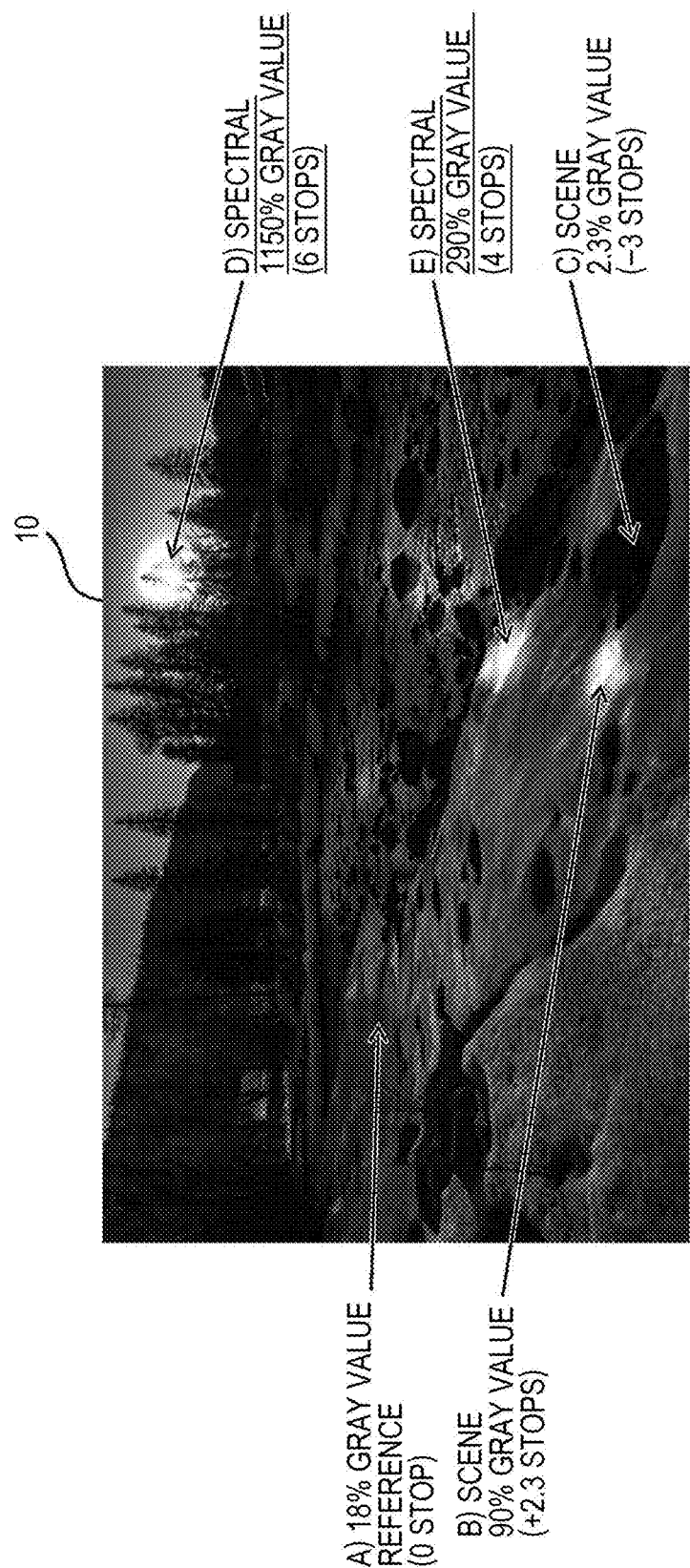
FIG. 14 is a diagram illustrating an example of a luminance value of a photographed image.

FIG. 14 is a diagram illustrating an example of a luminance value of a photographed image.

As illustrated in FIG. 14, photographed image (hereinafter, "an original image") 10A) shows pixels having a luminance value corresponding to 18% gray (0 Stop) that is reference reflectance to be a reference of brightness (hereinafter, "the reference luminance value" or "18% gray (Gray) value"). Original image 10B) shows pixels having a luminance value corresponding to 90% reflectance (90% gray) (2.3 Stops). HDR original image 100) shows pixels having a luminance value corresponding to mostly black 2.3% gray (−3 Stops). Original image 10D) shows pixels that are obtained by photographing the sun and have very bright luminance corresponding to 1150% gray (6 Stops).

Original image 10E) shows pixels that are obtained by photographing a position where specular reflection occurs and that have a luminance value corresponding to 290% gray (4 Stops).

Figure 15:
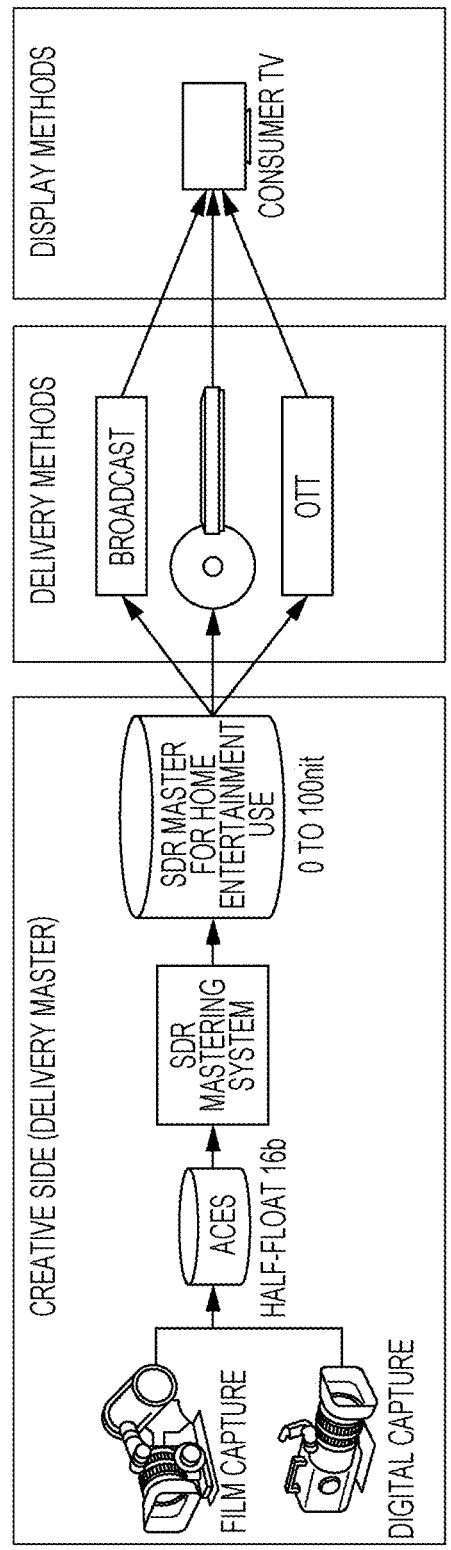
FIG. 15 is a diagram describing a flow for creating home entertainment master compatible with SDR and a relationship between a distributing medium and the display device.

2-3. Relationship Between Master Generation, Delivery System, and Display Device FIG. 15 is a diagram describing a flow for creating home entertainment master compatible with SDR and a relationship between a distributing medium and the display device.

Original image 10 illustrated in FIG. 14 is an image whose maximum luminance value is 1300 nit. That is to say, when a master image (an SDR image) compatible with SDR where the maximum luminance value is 100 nit is created by using original image 10, pixels having a luminance value of 100 nit or more cannot be expressed in SDR. For this reason, an SDR-compatible master image cannot be created by directly using the luminance value of original image 10 without conversion. That is to say, when an attempt is made to create the SDR-compatible master image by using original image 10, the luminance value of original image 10 should be converted into a luminance value in the SDR-compatible luminance range.

2-4. Mastering from Original Image to SDR Image

Figure 16B:
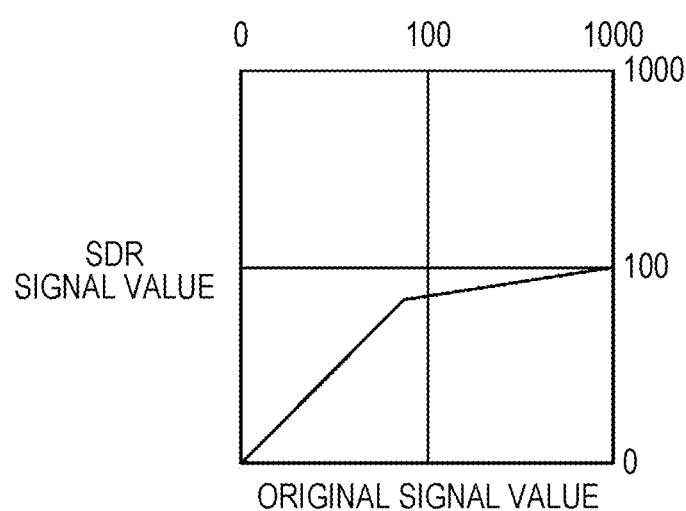
FIG. 16B is a diagram illustrating one example of a relationship between an original signal value and an SDR signal value for converting (mastering) the original signal value into the SDR signal value.

FIG. 16A is a diagram illustrating one example of the luminance value of a result of mastering an original image illustrated in FIG. 14 on an SDR image. FIG. 16B is a diagram illustrating one example of a relationship between an original signal value and an SDR signal value for converting (mastering) the original signal value into the SDR signal value. An original signal value is a luminance value in the luminance range of 0 to 1300 nit of original image 10 ("hereinafter, the luminance value of the original image"), and the SDR signal value is a luminance value in the SDR luminance range (hereinafter, "the SDR luminance value").

As illustrated in FIG. 16B, in the mastering from original image 10 to SDR image 11 in this example, a pixel corresponding to 18% gray (0 Stop) as the reference reflectance has a reference luminance value to be a reference of brightness. For this reason, in the mastering to the SDR image, even after original image 10 is converted into SDR image 11, the luminance value of original image 10 (18 nit) corresponding to 18% gray in original image 10 is not changed and is decided as the SDR luminance value.

As illustrated in FIG. 16B, in the mastering from original image 10 to SDR image 11, the luminance value of the original image is not changed and is decided as the SDR luminance value in the luminance range (0 to 90 nit) of not more than the luminance value of the original image corresponding to 90% gray of original image 10 (90 nit). Further, as illustrated in FIG. 16B, a luminance value of the original image in a luminance range of original image 10 (90 to 1300 [nit]) that is larger than the luminance value of the original image corresponding to 90% gray of original image 10 (90 nit) is allocated to the SDR luminance value in the luminance range of 90 to 100 nit by linear conversion.

For example, in the mastering of pixels corresponding to 90% gray (2.3 Stops) into SDR image 11 like SDR image 11B), even after original image 10 is converted into SDR image 11, the luminance value (90 nit) of the original image corresponding to 90% gray in original image 10 is not changed and is decided as the SDR luminance value.

Further, for example, in the mastering of a pixel corresponding to 2.3% gray (−3 Stops) into the SDR image like SDR image 11C), similarly to the above case, even after original image 10 is converted into SDR image 11, the luminance value of the original image corresponding to 2.3% gray in original image 10 (2 nit) is not changed and is decided as the SDR luminance value.

For example, in the mastering of a pixel corresponding to 1150% gray (6 Stops) to SDR image like SDR image 11D), a luminance value (1150 nit) of the original image corresponding to 1150% gray in original image 10 is converted into 100 nit that is a maximum luminance value in the SDR luminance range.

Further, for example, in the mastering of a pixel corresponding to 290% gray (4 Stops) into an SDR image like SDR image 11E), a luminance value of the original image corresponding to 290% gray in original image 10 is converted into 95 nit.

2-5. Relationship Between Master, Delivery System, and Display Device at Time of Introducing HDR FIG. 17 is a diagram describing a relationship between a master, a distributing system and the display device at a time of introducing HDR. In a case of original image 10 illustrated in FIG. 14, since the maximum luminance value of original image 10 is 1300 nit, original image 10 can be expressed by directly using the luminance value.

2-6. First Mastering from Original Image to HDR Image

Figure 18A:
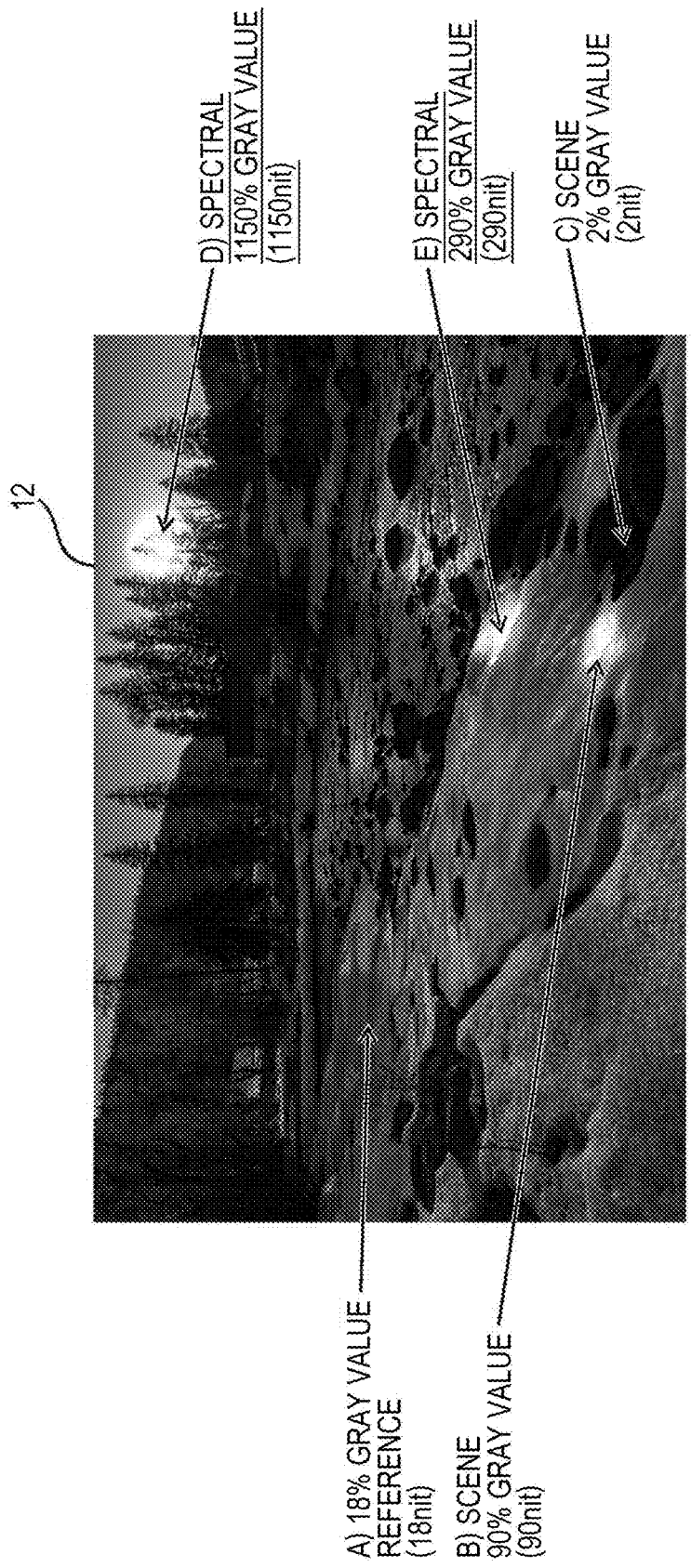
FIG. 18A is a diagram illustrating one example of a luminance value of a result of mastering the original image illustrated in FIG. 14 on an HDR image.
Figure 18B:
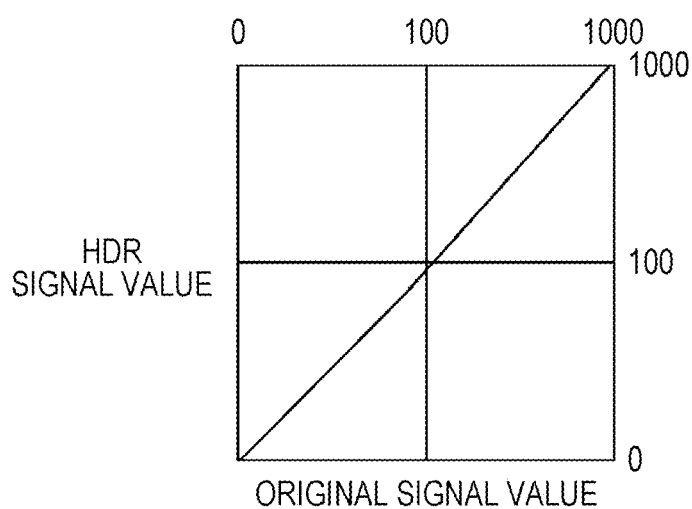
FIG. 18B is a diagram illustrating one example of a relationship between the original signal value and the HDR signal value for converting (mastering) the original signal value into the HDR signal value.

FIG. 18A is a diagram illustrating one example of the luminance value of a result of mastering an original image illustrated in FIG. 14 on an HDR image. FIG. 18B is a diagram illustrating one example of a relationship between an original signal value and an HDR signal value for converting (mastering) the original signal value into the HDR signal value. The HDR signal value is a luminance value in the HDR luminance range (hereinafter, "HDR luminance value"). In the mastering from the original image to the HDR image in this example, since luminance values of up to 2000 nit are allowed to be allocated as HDR luminance values, the luminance value of the original image can be maintained as it is also in the HDR image.

For example, since a pixel corresponding to 18% gray (0 Stop) as the reference reflectance is a pixel having the reference luminance value to be a reference of brightness, in the mastering into the HDR image, like HDR image 12A), even after original image 10 is converted into HDR image 12, the luminance value of original image 10 corresponding to 18% gray in original image 10 (18 nit) is not changed and is decided as the HDR luminance value.

Similarly, for example, in the mastering of a pixel corresponding to 90% gray (2.3 Stops) like HDR image 12B), a pixel corresponding to 2.3% gray (−3 Stops) like HDR image 12C), a pixel corresponding to 1150% gray (6 Stops) like HDR image 12D), and a pixel corresponding to 290% gray (4 Stops) like HDR image 12E) into the HDR image, the luminance value of the original image is not changed and is decided as the HDR luminance value.

2-7. Second Mastering from Original Image into HDR Image

Figure 19A:
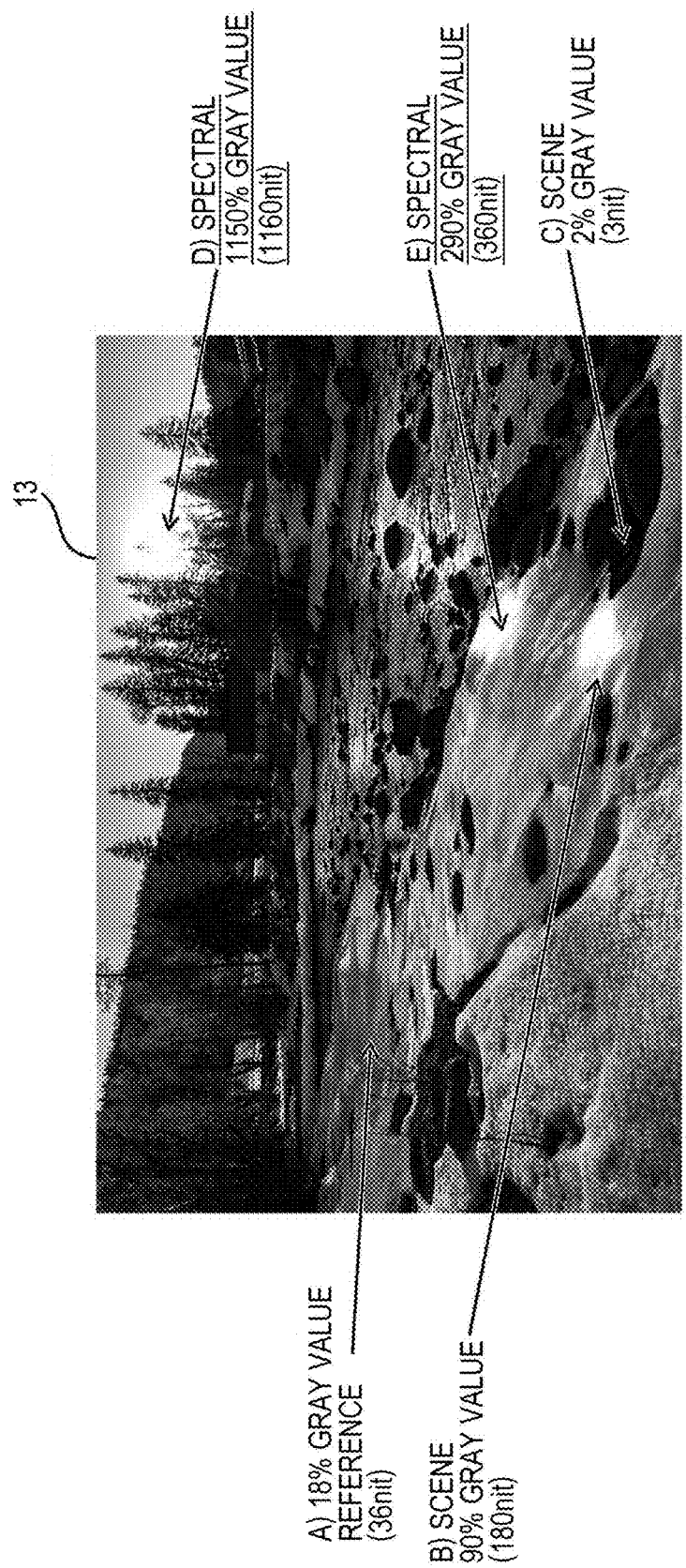
FIG. 19A is a diagram illustrating another example of the luminance value of the result of mastering the original image illustrated in FIG. 14 on the HDR image.
Figure 19B:
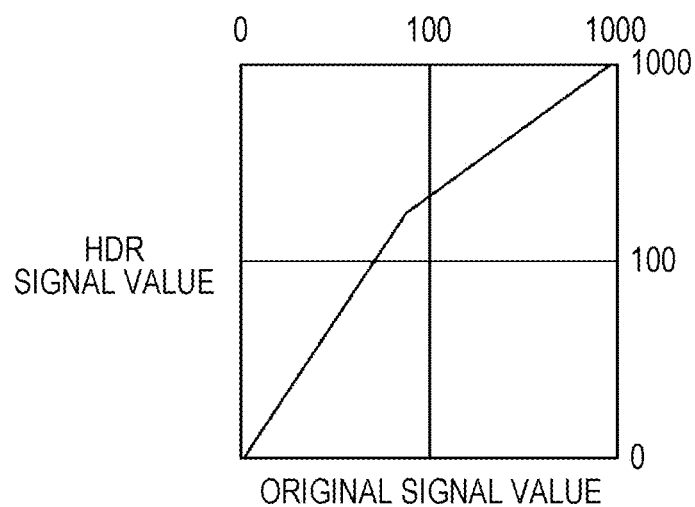
FIG. 19B is a diagram illustrating another example of a relationship between the original signal value and the HDR signal value for converting (mastering) the original signal value into the HDR signal value.

FIG. 19A is a diagram illustrating another example of the luminance value of a result of mastering an original image illustrated in FIG. 14 on an HDR image. FIG. 19B is a diagram illustrating another example of a relationship between an original signal value and an HDR signal value for converting (mastering) the original signal value into the HDR signal value. In the mastering from the original image to the HDR image in this example, the luminance values of up to 2000 nit are allowed to be allocated as HDR luminance values.

As illustrated in FIG. 19B, in the mastering from original image 10 into HDR image 13 in this example, after an entire balance of HDR image 13 is considered, a value that is twice as large as a reference luminance value of the original image is decided as a reference luminance value of HDR image 13 as a luminance value of a pixel corresponding to 18% gray (0 Stop) as the reference reflectance according to a creator's intention.

As illustrated in FIG. 19B, in the mastering from original image 10 to HDR image 13, the luminance value of HDR is decided to a value that is twice as large as the luminance value of the original image in the luminance range (0 to 90 nit) of not more than the luminance value of the original image corresponding to 90% gray of original image 10 (90 nit). Further, as illustrated in FIG. 19B, in the mastering from original image 10 into HDR image 13, a luminance value of the original image in a luminance range (90 to 1300 [nit]) that exceeds the luminance value of the original image corresponding to 90% gray of original image 10 (90 nit) is allocated to the HDR luminance value in 180 to HPL (HDR Peak Luminance) by linear conversion. HPL means a maximum value in the HDR luminance range.

For example, in the mastering of a pixel corresponding to 90% gray (2.3 Stops) into HDR image 13, like HDR image 13B), a value (180 nit) that is twice as large as the luminance value of the original image corresponding to 90% gray in original image 10 (90 nit) is decided as the HDR luminance value.

Further, for example, in the mastering of a pixel corresponding to 2.3% gray (−3 Stops) into HDR image 13, like HDR image 13C), a value that is twice as large as the luminance value of the original image corresponding to 2.3% gray in original image 10 is decided as the HDR luminance value.

Further, for example, in the mastering of a pixel corresponding to 1150% gray (6 Stops) into HDR image 13, like HDR image 13D), a luminance value (1160 nit) obtained by performing the above linear conversion on the luminance value of the original image corresponding to 1150% gray in original image 10 is decided as the HDR luminance value.

Further, for example, in the mastering of a pixel corresponding to 290% gray (4 Stops) into HDR image 13, like HDR image 13E), a luminance value (360 nit) obtained by performing the above linear conversion on the luminance value of the original image corresponding to 290% gray in original image 10 is decided as the HDR luminance value.

2-8. Display Process for HDR in HDRTV

Since the maximum luminance value (the second maximum luminance value) displayable even on HDRTV is, for example, 750 nit, namely, smaller than a first maximum luminance value (HPL: for example, 1500 nit) that is the maximum luminance value of the HDR signal, the HDR signal cannot be directly displayed on HDRTV. For this reason, a linear signal that has been subjected to the HDR EOTF conversion should be subjected to luminance conversion based on the second maximum luminance value (DPL: for example, 750 nit) displayable on the display device.

Figure 21:
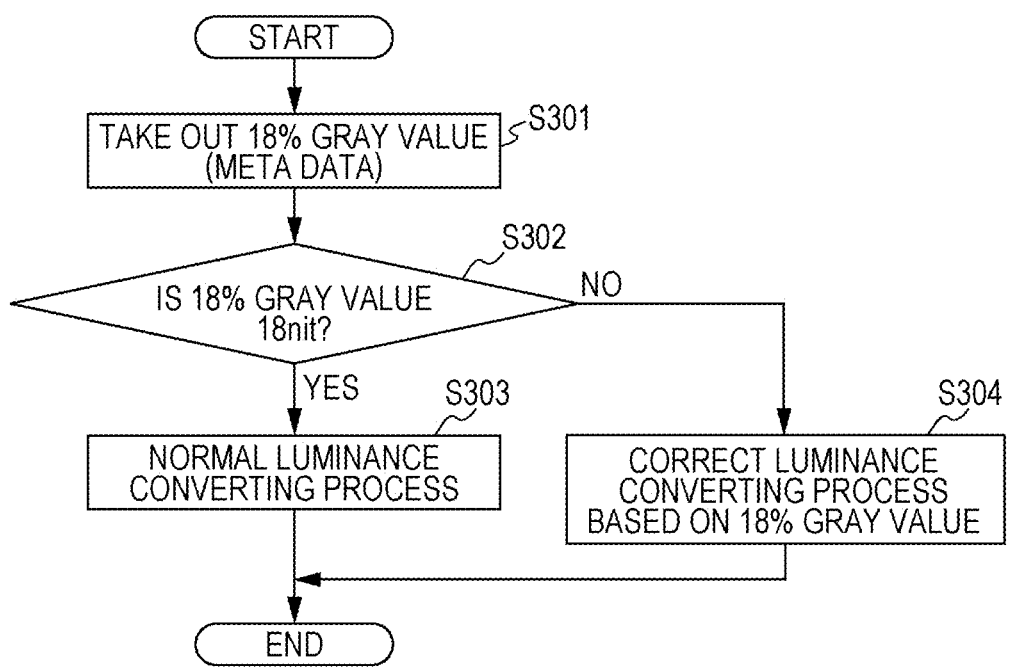
FIG. 21 is a flowchart illustrating the converting method according to a second exemplary embodiment, that is to say.

FIG. 20 is a block diagram illustrating a constitution of a converting apparatus according to the second exemplary embodiment. Specifically, FIG. 20 is a diagram illustrating a display process for converting the HDR signal and generating an HDR video in HDRTV. FIG. 21 is a flowchart illustrating the converting method according to the second exemplary embodiment. That is to say, FIG. 21 is a diagram illustrating algorithm at a time of a luminance converting process.

As illustrated in FIG. 20, converting apparatus 300 includes EOTF converter 301 for HDR, luminance converter 302, and display 303. Converting apparatus 300 is provided to, for example, HDRTV, and it is an apparatus for converting luminance of a video in order to display the video on HDRTV.

Respective components of converting apparatus 300 are described in detail below in description about the converting method.

The converting method to be performed by converting apparatus 300 is described with reference to FIG. 21. The converting method includes steps S301 to S304 described below.

EOTF converter 301 for HDR in converting apparatus 300 acquires a luminance value (a reference luminance value) corresponding to 18% gray sent as first meta data of the HDR signal (S301). EOTF converter 301 for HDR may measure an HDR luminance value indicated by the HDR signal to measure the reference luminance value, thereby acquiring the luminance value. As a result, EOTF converter 301 for HDR functions also as the acquirer for acquiring the HDR signal indicating the HDR luminance value of a video. Further, EOTF converter 301 for HDR performs the HDR EOTF conversion on the HDR signal of the acquired HDR video so as to convert the HDR signal into the HDR luminance value corresponding to the HDR signal.

Luminance converter 302 determines whether the acquired reference luminance value is 18 nit (S302).

When determining that the acquired reference luminance value is 18 nit (Yes in S302), luminance converter 302 finds that the reference luminance value does not change, and thus the normal luminance converting process is executed (S303). On the other hand, when the acquired reference luminance value is different from 18 nit (No in S302), luminance converter 302 finds that a creator has intentionally changed the reference luminance value. For this reason, a correction is made based on the reference luminance value, and the luminance converting process is executed (S304). That is to say, luminance converter 302 performs luminance conversion that executes one of a plurality of luminance converting processes for converting an HDR luminance value (namely, an HDR luminance value obtained by converting the HDR signal in EOTF converter 301 for HDR) indicated by the acquired HDR signal into a display luminance value in the display luminance range where the maximum luminance value is defined as a second maximum luminance value (DPL) which is smaller than a maximum value (HPL) in the HDR luminance range and is larger than a maximum value (100 nit) in the SDR luminance range. Luminance converter 302, then, switches the luminance converting process depending on whether the reference luminance value in the meta data (first meta data) of the acquired HDR signal is 18 nit, and converts the HDR luminance value into the display luminance value through the switched luminance converting process.

Luminance converter 302 performs conversion into a display luminance value in the display luminance range similarly to luminance converter 102 of the first exemplary embodiment, but HDRTV is used as the display instead of SDRTV that is used in luminance converter 102. When the converted HDR signal is input into HDRTV, display 303 can display an HDR video that is matched to the display luminance range of the maximum value that is a limit of HDRTV, on HDRTV.

Specific examples of the luminance converting process are described below.

2-9. First Specific Example

Figure 22A:
FIG. 22A is a diagram illustrating one example of a result of acquiring an HDR image obtained by the mastering of FIG. 18A and performing luminance conversion for a display unit whose maximum luminance value is 500 nit.
Figure 22B:
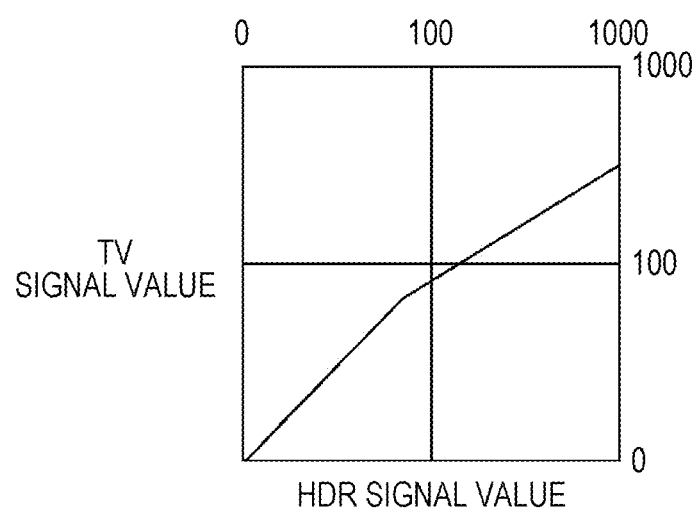
FIG. 22B is a diagram illustrating one example of a relationship between the HDR signal value and a TV signal value for performing luminance conversion from the HDR signal value into the TV signal value.

FIG. 22A illustrates one example of the result of acquiring the HDR image obtained by the mastering of FIG. 18A and performing luminance conversion for the display unit whose second maximum luminance value is 500 nit. FIG. 22B is a diagram illustrating one example of a relationship between the HDR signal value and a TV signal value for performing luminance conversion from the HDR signal value into the TV signal value. The TV signal value is a signal indicating a luminance value of HDRTV in the display luminance range.

In this example, the second maximum luminance value displayable by HDRTV is limited to 500 nit. For this reason, HDR luminance value indicated by the HDR signal should be converted into a display luminance value in the display luminance range.

In step S301, a luminance value (a reference luminance value) corresponding to 18% gray (0 Stop) to be a reference of brightness is taken out from the acquired HDR signal. In step S302, the HDR signal indicating the luminance value of HDR image 12 maintains 18 nit as the reference luminance value. For this reason, the linear conversion is performed in step S303 on a luminance value, which is indicated by the HDR signal and is a luminance value (90 nit) corresponding to 90% gray or less, so that the luminance value indicated by the HDR signal is maintained, and on a luminance value, which exceeds a luminance value (90 nit) corresponding to 90% gray and is indicated by the HDR signal so that a first maximum luminance value (HPL: 1300 nit) indicated by the HDR signal is a second maximum luminance value (DPL: 500 nit) displayable on HDRTV.

That is to say, in the luminance conversion (S303) of this example, when the reference luminance value is 18 nit that is the first reference value, the HDR luminance value indicated by the HDR signal, which indicates a luminance value of 90 nit or less as the second reference value larger than 18 nit is decided as the display luminance value. Further, in the luminance conversion (S303), when the reference luminance value is 18 nit as the first reference value, the linear conversion is performed on the HDR luminance values, of from 90 nit to the first maximum luminance value (HPL: for example, 1300 nit), indicated by the HDR signal indicating the luminance value exceeding 90 nit so that HPL is made to correspond to the second maximum luminance value (DPL: for example, 500 nit) displayable on HDRTV, and the HDR luminance value is converted into the display luminance value.

When the luminance conversion is performed, so that luminance values in pixel A) of HDR image 12 corresponding to 18% gray, pixel B) of HDR image 12 compatible with 90% gray, and pixel C) of HDR image 12 corresponding to 2.3% gray are not changed and are decided as the display luminance values. A value of 450 nit obtained by performing the above linear conversion on pixel D) of HDR image 12 corresponding to 1150% gray is decided as the display luminance value, and 163 nit obtained by performing the above linear conversion on pixel E) of HDR image 12 corresponding to 290% gray is decided as the display luminance value.

2-10. Second Specific Example

Figure 23A:
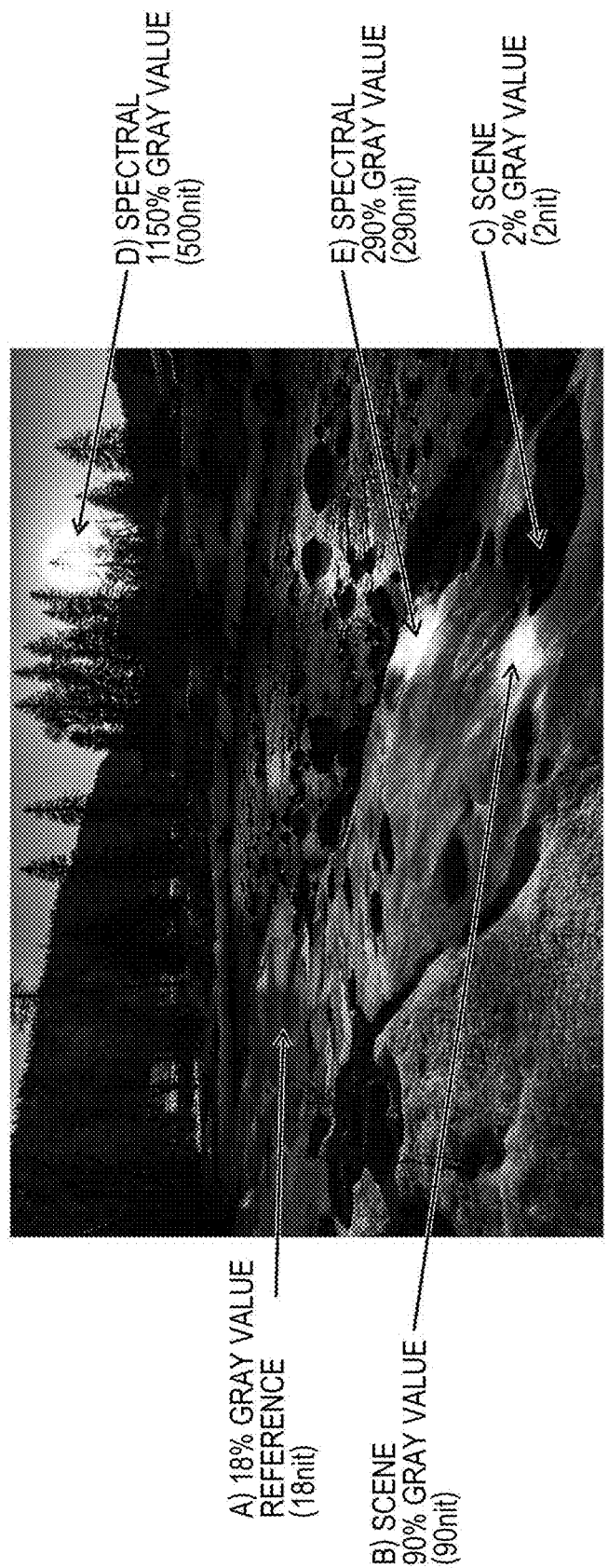
FIG. 23A is a diagram illustrating one example of the result of acquiring the HDR image obtained by the mastering of FIG. 18A and performing luminance conversion for the display unit whose maximum luminance value is 500 nit.
Figure 23B:
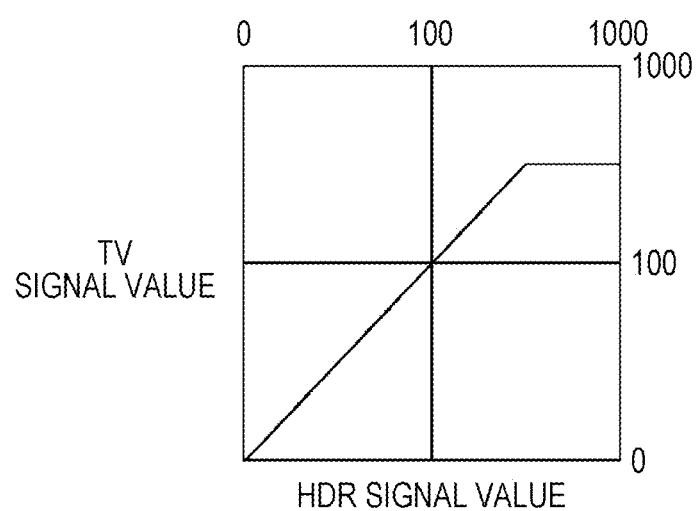
FIG. 23B is a diagram illustrating another example of the relationship between the HDR signal value and the TV signal value for performing luminance conversion on the HDR signal value into the TV signal value.

FIG. 23A illustrates one example of the result of acquiring the HDR image obtained by the mastering of FIG. 18A and performing luminance conversion for the display unit whose second maximum luminance value is 500 nit. FIG. 23B is a diagram illustrating another example of a relationship between the HDR signal value and a TV signal value for performing the luminance conversion from the HDR signal value into the TV signal value.

In this example, the second maximum luminance value displayable by HDRTV is limited to 500 nit. For this reason, the HDR luminance value indicated by the HDR signal should be converted into a display luminance value in the display luminance range.

In step S301, a luminance value (a reference luminance value) corresponding to 18% gray (0 Stop) to be a reference of brightness is taken out from the acquired HDR signal. In step S302, the HDR signal indicating the luminance value of HDR image 12 maintains 18 nit as the reference luminance value. For this reason, step S303 is executed, and the luminance value, which is a luminance value (90 nit) corresponding to 90% gray or less and is indicated by the HDR signal, is maintained. Further, in step S303, the luminance value, which is the luminance value (90 nit) corresponding to 90% gray or more but less than the second maximum luminance value (500 nit) of HDRTV and is indicated by the HDR signal, is maintained. Further, in step S303, as to a luminance value, which is the second maximum luminance value (500 nit) of HDRTV or more and is indicated by the HDR signal, a luminance value, which is obtained by clipping the luminance value indicated by the HDR signal with 500 nit, is decided as the display luminance value.

That is to say, in the luminance conversion (S303) of this example, when the reference luminance value is 18 nit as the first reference value, an HDR luminance value indicated by the HDR signal, which indicates the second maximum luminance value (DPL: 500 nit) or less displayable on HDRTV, is decided as the display luminance value. Further, in the luminance conversion (S303), DPL is decided as the display luminance value for the HDR luminance value indicated by the HDR signal which indicates a luminance value exceeding DPL.

When the luminance conversion is performed in such a manner, so that luminance values in pixel A) of HDR image 12 corresponding to 18% gray, pixel B) of HDR image 12 corresponding to 90% gray, pixel C) of HDR image 12 corresponding to 2.3% gray, and pixel E) of HDR image 12 corresponding to 290% gray are not changed and are decided as the display luminance values. A value of 500 nit obtained by clipping pixel D) of HDR image 12 corresponding to 1150% gray with 500 nit is decided as the display luminance value.

2-11. Third Specific Example

Figure 24A:
FIG. 24A is a diagram illustrating one example of the result of acquiring the HDR image obtained by the mastering of FIG. 19A and performing luminance conversion for the display unit whose maximum luminance value is 500 nit.
Figure 24B:
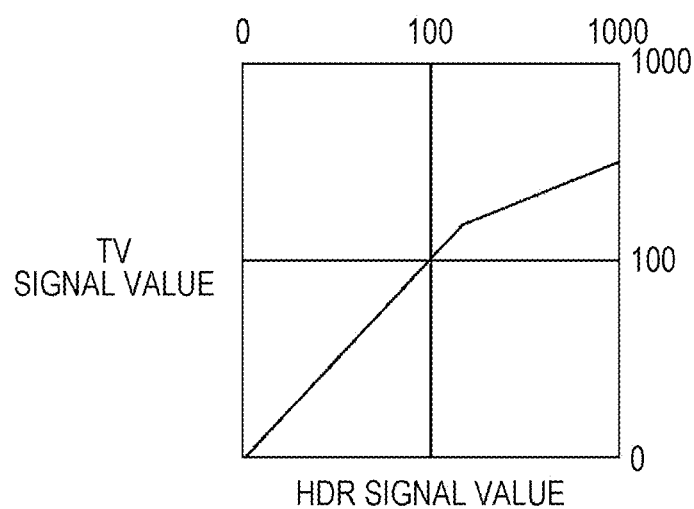
FIG. 24B is a diagram illustrating another example of the relationship between the HDR signal value and the TV signal value for performing luminance conversion on the HDR signal value into the TV signal value.

FIG. 24A illustrates one example of the result of acquiring the HDR image obtained by the mastering of FIG. 19A and performing luminance conversion for the display unit whose second maximum luminance value is 500 nit. FIG. 24B is a diagram illustrating another example of a relationship between an HDR signal value and a TV signal value for performing luminance conversion form the HDR signal value into the TV signal value.

In this example, the second maximum luminance value displayable by HDRTV is limited to 500 nit. For this reason, HDR luminance value indicated by the HDR signal should be converted into a display luminance value in the display luminance range.

In step S301, a luminance value (a reference luminance value) corresponding to 18% gray (0 Stop) to be a reference of brightness is taken out from the acquired HDR signal. In step S302, the HDR signal indicating a luminance value of HDR image 13 is maintained at 36 nit as the reference luminance value, and thus it is found that the creator has intentionally changed the reference luminance value. For this reason, the linear conversion is performed in step S304 on a luminance value, which is indicated by the HDR signal and is a luminance value (180 nit) corresponding to 90% gray or less, so that the luminance value indicated by the HDR signal is maintained, and on a luminance value, which exceeds the luminance value (180 nit) corresponding to 90% gray and is indicated by the HDR signal, so that a first maximum luminance value (HPL: 1300 nit) indicated by the HDR signal is a second maximum luminance value (DPL: 500 nit) displayable on HDRTV.

That is to say, in the luminance conversion (S304) of this example, when the reference luminance value is a third reference value (36 nit) different from the first reference value (18 nit), the HDR luminance value indicated by the HDR signal, which indicates a luminance value of not more than a fourth reference value (90 nit) larger than 36 nit, is decided as the display luminance value. Further, in the luminance conversion (S304), the linear conversion is performed on HDR luminance values exceeding 90 nit, namely, from 90 nit to the second maximum luminance value (DPL) displayable on HDRTV so that the first maximum luminance value (HPL) is made to correspond to the second maximum luminance value (DPL). As a result, the HDR luminance value is converted into the display luminance value.

When the luminance conversion is performed in such a manner, so that luminance values in pixel A) of HDR image 13 corresponding to 18% gray, pixel B) of HDR image 13 corresponding to 90% gray, and pixel C) of HDR image 13 corresponding to 2.3% gray are not changed and are decided as the display luminance values. A value of 446 nit obtained by performing the above linear conversion on pixel D) of HDR image 13 corresponding to 1150% gray is decided as the display luminance value, and a value of 313 nit obtained by performing the above linear conversion on pixel E) of HDR image 13 corresponding to 290% gray is decided as the display luminance value.

2-12. Fourth Specific Example

Figure 25A:
FIG. 25A is a diagram illustrating one example of the result of acquiring the HDR image obtained by the mastering of FIG. 19A and performing luminance conversion for the display unit whose maximum luminance value is 500 nit.
Figure 25B:
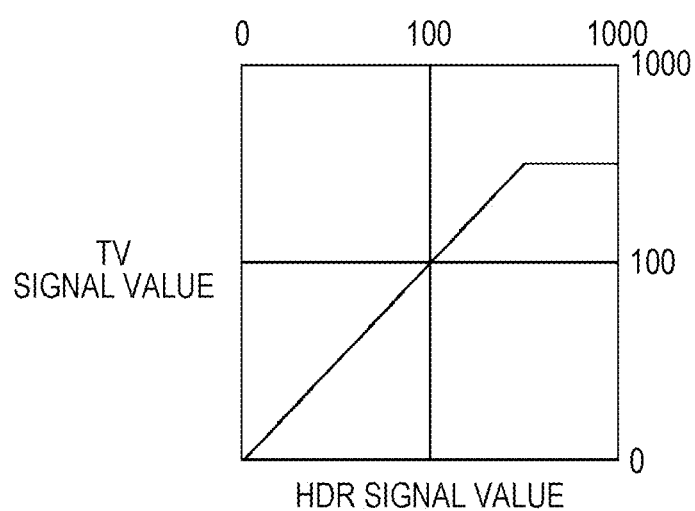
FIG. 25B is a diagram illustrating another example of the relationship between the HDR signal value and the TV signal value for performing luminance conversion on the HDR signal value into the TV signal value.

FIG. 25A illustrates one example of the result of acquiring the HDR image obtained by the mastering of FIG. 19A and performing luminance conversion for the display unit whose second maximum luminance value is 500 nit. FIG. 25B is a diagram illustrating another example of a relationship between an HDR signal value and a TV signal value for the luminance conversion from the HDR signal value into the TV signal value.

In this example, the second maximum luminance value displayable by HDRTV is limited to 500 nit. For this reason, HDR luminance value indicated by the HDR signal should be converted into a display luminance value in the display luminance range.

In step S301, a luminance value (a reference luminance value) corresponding to 18% gray (0 Stop) to be a reference of brightness is taken out from the acquired HDR signal. In step S302, the HDR signal indicating a luminance value of HDR image 13 is maintained at 36 nit as the reference luminance value, and thus it is found that the creator has intentionally changed the reference luminance value. For this reason, in step S304, a luminance value, which is indicated by the HDR signal and is less than a second maximum luminance value (500 nit) displayable on HDRTV is maintained at a value as it is, and a luminance value, which is not less than the second maximum luminance value (500 nit) displayable on HDRTV and is indicated by the HDR signal is clipped with 500 nit. A luminance value obtained in such a manner is decided as the display luminance value.

That is to say, in the luminance conversion (S304) of this example, when the reference luminance value is the third reference value (36 nit) different from the first reference (18 nit), the HDR luminance value indicated by the HDR signal indicating the luminance value that is not more than the second maximum luminance value (DPL: 500 nit) displayable on HDRTV is decided as the display luminance value. Further, in the luminance conversion (S304), DPL is decided as the display luminance value for HDR luminance value indicated by the HDR signal indicating the luminance value exceeding DPL.

When the luminance conversion is performed in such a manner, the luminance values in pixel A) of HDR image 13 corresponding to 18% gray, pixel B) of HDR image 13 corresponding to 90% gray, pixel C) of HDR image 13 corresponding to 2.3% gray, and pixel E) of HDR image 13 corresponding to 290% gray are not changed and are decided as the display luminance values. A value of 500 nit obtained by clipping pixel D) of HDR image 13 corresponding to 1150% gray with 500 nit is decided as the display luminance value.

2-13. Fifth Specific Example

Figure 26B:
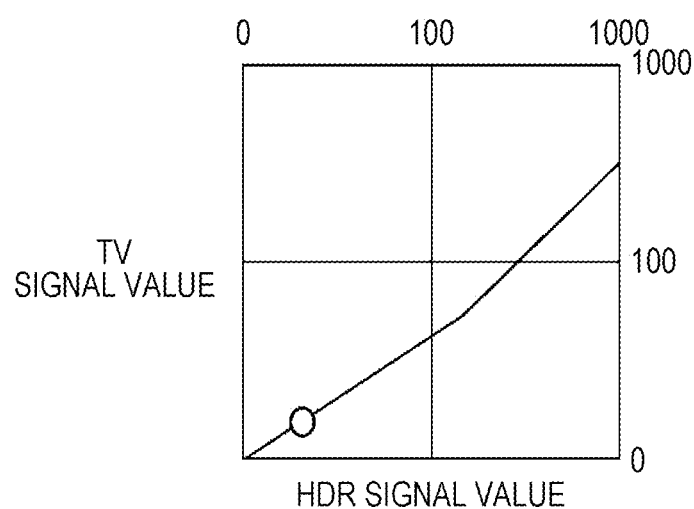
FIG. 26B is a diagram illustrating another example of the relationship between the HDR signal value and the TV signal value for performing luminance conversion on the HDR signal value into the TV signal value.

FIG. 26A illustrates one example of the result of acquiring the HDR image obtained by the mastering of FIG. 19A and performing luminance conversion for the display unit whose second maximum luminance value is 500 nit. FIG. 26B is a diagram illustrating another example of a relationship between an HDR signal value and a TV signal value for luminance conversion from the HDR signal value into the TV signal value.

In this example, the second maximum luminance value displayable by HDRTV is limited to 500 nit. For this reason, the HDR luminance value indicated by the HDR signal should be converted into a display luminance value in the display luminance range.

In step S301, a luminance value (a reference luminance value) corresponding to 18% gray (0 Stop) to be a reference of brightness is taken out from the acquired HDR signal. In step S302, the HDR signal indicating a luminance value of HDR image 13 is maintained at 36 nit as the reference luminance value, and thus it is found that the creator has intentionally changed the reference luminance value. However, the second maximum luminance value of HDRTV is 500 nit, and this is not much high in comparison with HPL, and thus the reference luminance value to be displayed on an HDRTV side is converted into 18 nit. In this case, in step S304, the luminance value, which is not more than the luminance value (180 nit) of HDR image 13 corresponding to 90% gray and is indicated by the HDR signal, is multiplied by a ratio between a converted reference luminance value and an original reference luminance value (18/36=½). Further, in step S304, the linear conversion is performed on the luminance value, which exceeds the luminance value (180 nit) corresponding to 90% gray and is indicated by the HDR signal, so that the first maximum luminance value (HPL: 1300 nit) indicated by the HDR signal becomes the second maximum luminance value (DPL: 500 nit) displayable on HDRTV.

That is to say, in the luminance conversion (S304) of this example, when the reference luminance value is the third reference value (36 nit) different from the first reference value (18 nit), the HDR luminance value indicated by the HDR signal, which indicates a luminance value of not more than the fourth reference value (180 nit) larger than 36 nit, is converted into the display luminance value in response to the ratio between 18 nit and 36 nit (½). Further, in the luminance conversion (S304), the linear conversion is performed on the HDR luminance values from 180 nit to the first maximum luminance value (HPL: for example, 1300 nit) indicated by the HDR signal indicating the luminance value exceeding 36 nit so that HPL is made to correspond to the second maximum luminance value (DPL: for example, 500 nit) displayable on HDRTV, and thus the HDR luminance value is converted into the display luminance value.

When the luminance conversion is performed in such a manner, in pixel A) of HDR image 13 corresponding to 18% gray, 18 nit obtained by multiplying the HDR luminance value (36 nit) by ½ is decided as the display luminance value. Further, in pixel B) of HDR image 13 corresponding to 90% gray, 90 nit obtained by multiplying the HDR luminance value (180 nit) by ½ is decided as the display luminance value. Further, in pixel C) of HDR image 13 corresponding to 2% gray, 2 nit obtained by multiplying the HDR luminance value by ½ is decided as the display luminance value. Further, in pixel D) of HDR image 13 corresponding to 1150% gray, 450 nit obtained by performing the linear conversion on the HDR luminance value (1160 nit) is decided as the display luminance value. Further, in pixel E) of HDR image 13 corresponding to 290% gray, 190 nit obtained by performing the linear conversion on HDR luminance value (360 nit) is decided as display luminance value.

2-14. Sixth Specific Example

Figure 27A:
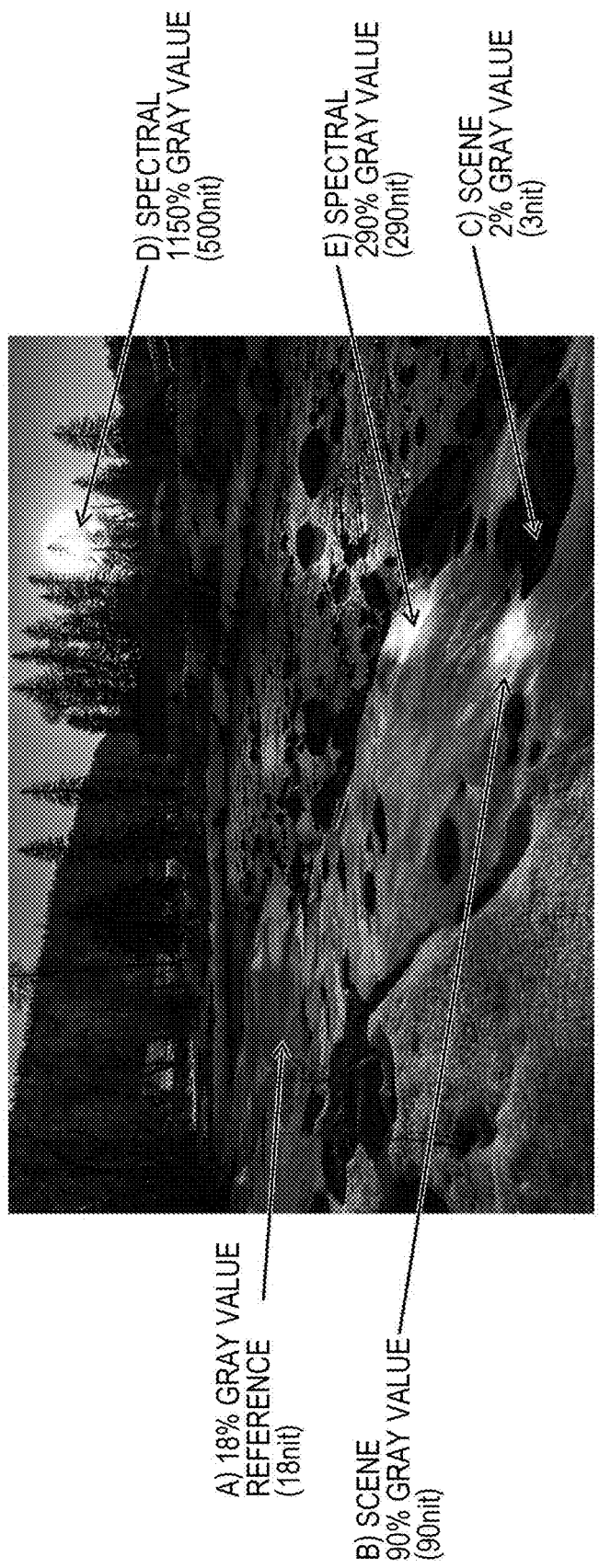
FIG. 27A is a diagram illustrating one example of the result of acquiring the HDR image obtained by the mastering of FIG. 19A and performing luminance conversion for the display unit whose maximum luminance value is 500 nit.
Figure 27B:
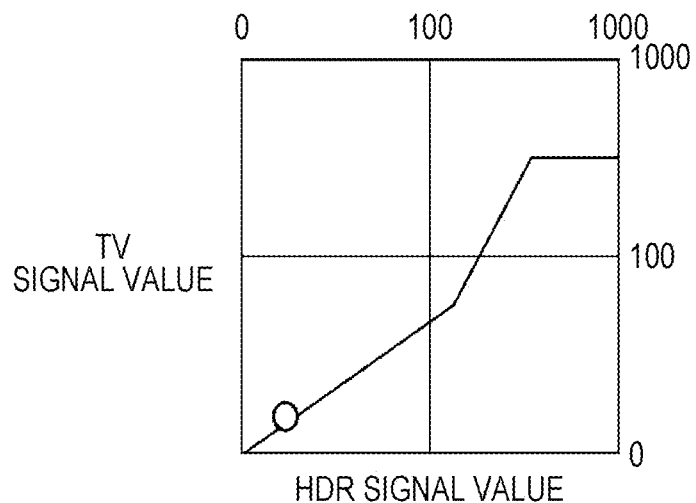
FIG. 27B is a diagram illustrating another example of the relationship between the HDR signal value and the TV signal value for performing luminance conversion on the HDR signal value into the TV signal value.

FIG. 27A illustrates one example of the result of acquiring the HDR image obtained by the mastering of FIG. 19A and performing luminance conversion for the display unit whose second maximum luminance value is 500 nit. FIG. 27B is a diagram illustrating another example of a relationship between an HDR signal value and a TV signal value for the luminance conversion from the HDR signal value into the TV signal value.

In this example, the maximum luminance value displayable on HDRTV is limited to 500 nit. For this reason, the HDR luminance value indicated by the HDR signal should be converted into a display luminance value in the display luminance range.

In step S301, a luminance value (a reference luminance value) corresponding to 18% gray (0 Stop) to be a reference of brightness is taken out from the acquired HDR signal. In step S302, the HDR signal indicating a luminance value of HDR image 13 is maintained at 36 nit as the reference luminance value, and thus it is found that the creator has intentionally changed the reference luminance value. However, the second maximum luminance value of HDRTV is 500 nit, and this is not much high in comparison with HPL, and thus the reference luminance value to be displayed on an HDRTV side is converted into 18 nit. In this case, in step S304, the luminance value, which is not more than the luminance value (180 nit) of HDR image 13 corresponding to 90% gray and is indicated by the HDR signal, is multiplied by a ratio between a converted reference luminance value and an original reference luminance value (18/36=½). Further, the linear conversion is performed in step S304 on a luminance value, which exceeds the reference luminance value (180 nit) corresponding to 90% gray, is less than the second maximum luminance value (500 nit) displayable on HDRTV and is indicated by the HDR signal, and a luminance value, which is obtained by clipping the luminance value which is not less than the second maximum luminance value (500 nit) displayable on HDRTV and is indicated by the HDR signal with 500 nit, is decided as the display luminance value.

That is to say, in the luminance conversion (S304) of this example, when the reference luminance value is the third reference value (36 nit) different from the first reference value (18 nit), the HDR luminance value indicated by the HDR signal, which indicates a luminance value being not more than the fourth reference value (180 nit) larger than 36 nit, is converted into the display luminance value in response to the ratio between 18 nit and 36 nit. Further, in the luminance conversion (S304), the linear conversion in which a fifth reference value is made to correspond to the second maximum luminance value (DPL: for example, 500 nit) displayable on HDRTV is performed on the HDR luminance values from 180 nit to a fifth reference value indicated by the HDR signal indicating the luminance value from 180 nit to the fifth reference value larger than 180 nit so that the HDR luminance value is converted into the display luminance value. Further, in the luminance conversion (S304), as to the HDR signal indicating the luminance value exceeding the fifth reference value, DPL is decided as the display luminance value.

When the luminance conversion is performed in such a manner, in pixel A) of HDR image 13 corresponding to 18% gray, 18 nit obtained by multiplying the HDR luminance value (36 nit) by ½ is decided as the display luminance value. Further, in pixel B) of HDR image 13 corresponding to 90% gray, 90 nit obtained by multiplying the HDR luminance value (180 nit) by ½ is decided as the display luminance value. Further, in pixel C) of HDR image 13 corresponding to 2% gray, 2 nit obtained by multiplying the HDR luminance value by ½ is decided as the display luminance value. Further, in pixel D) of HDR image 13 corresponding to 1150% gray, 500 nit obtained by clipping the HDR luminance value (1160 nit) is decided as the display luminance value. Further, in pixel E) of HDR image 13 corresponding to 290% gray, 290 nit obtained by performing the linear conversion on HDR luminance value (360 nit) is decided as display luminance value.

2-15. First Modified Example of the Second Exemplary Embodiment

The second exemplary embodiment describes the process for deciding a signal value when the luminance converting process in HDRTV is switched in response to the luminance value (the reference luminance value) corresponding to 18% gray to be transmitted as the first meta data of the HDR signal, and the HDR signal is output to display 303. In HDRTV, a tone mapping method (luminance converting process) can be switched in response to not only the HDR signal to be acquired as an input, but also a viewing environment such as brightness of a room, and various display modes such as a dynamic mode and a cinema mode of HDRTV. That is to say, converting apparatus 300 may switch the luminance converting process in response to not only the first meta data of the HDR signal but also meta data (second meta data) on the HDRTV side.

For example, when a room where HDRTV is viewed is bright, the mapping may be performed so that the reference luminance value is larger than a case where a room is dark. Further, also in a display mode where the luminance value is entirely larger like the dynamic mode, the mapping may be performed so that the reference luminance value is larger. On the contrary, in a case of the display mode such as the cinema mode where reproducibility of a low-luminance region is emphasized, the operation may be performed with the reference luminance value being fixed to 18 nit.

Figure 28:
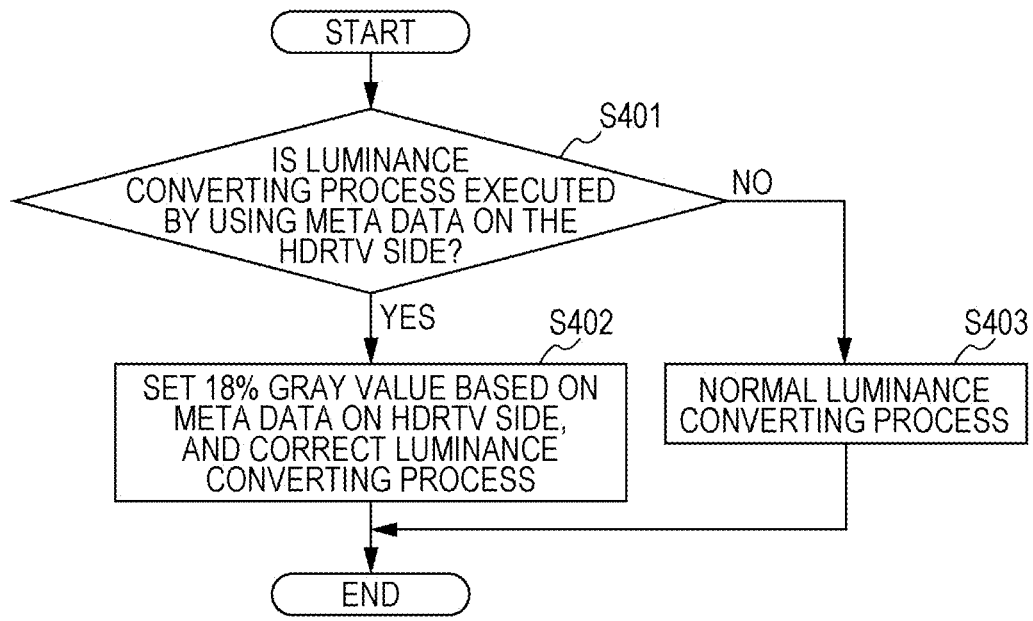
FIG. 28 is a flowchart illustrating the converting method according to a first modified example of the second exemplary embodiment.

FIG. 28 is a flowchart illustrating the converting method according to a first modified example of the second exemplary embodiment. That is to say, FIG. 28 is a flowchart illustrating the operation for executing the luminance converting process based on the meta data on the HDRTV side such as the viewing environment and the display mode.

Luminance converter 302 determines whether the luminance converting process is executed in response to the meta data on the HDRTV side (S401). As a result, luminance converter 302 acquires the meta data on the HDRTV side indicating a display characteristic of HDRTV from HDRTV.

When luminance converter 302 determines that the luminance converting process is executed in response to the meta data on the HDRTV side (Yes in S401), the reference luminance value is set based on to the meta data on the HDRTV side, so that the luminance converting process is corrected (S402).

On the other hand, when luminance converter 302 determines that luminance converting process is not executed in response to the meta data on the HDRTV side (No in S402), the normal luminance converting process is executed (S403).

That is to say, luminance converter 302 further switches the luminance converting process in response to the acquired meta data on the HDRTV side, and converts the HDR luminance value into the display luminance value through the switched luminance converting process.

Figure 29:
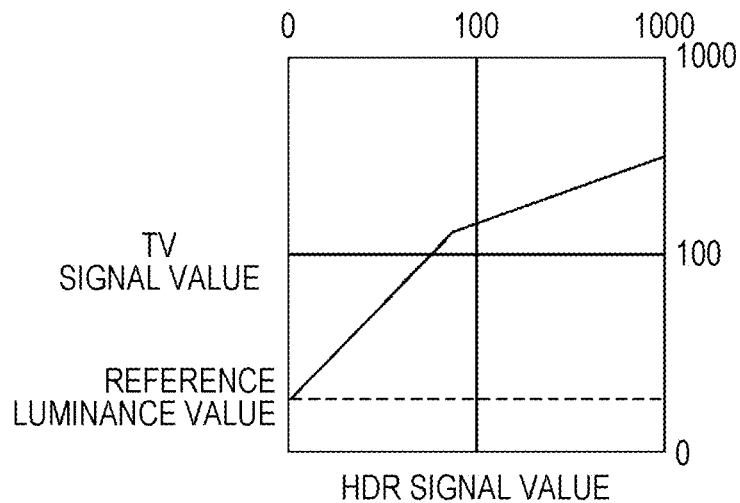
FIG. 29 is a diagram illustrating one example of the relationship between the HDR signal value and the TV signal value for performing luminance conversion on the HDR signal value into the TV signal value to be used in the luminance converting process based on meta data on an HDRTV side.

FIG. 29 is a diagram illustrating one example of the relationship between an HDR signal value and a TV signal value for performing luminance conversion from the HDR signal value into the TV signal value to be used in the luminance converting process based on the meta data on the HDRTV side.

General HDRTV is equipped with a function for measuring brightness around HDRTV and adjusting display luminance of HDRTV using a light quantity sensor mounted into HDRTV. In such HDRTV, for example, when the periphery is bright, the luminance value is entirely increased and an image is displayed. In another manner, also when HDRTV is set into the display mode such as the dynamic mode where a high-luminance signal is emphasized, the luminance value of a backlight such as liquid crystal is entirely increased and the image is displayed. The meta data on the HDRTV side is meta data indicating the viewing environment or the display mode of HDRTV.

As a result of executing the image display process with the luminance value being entirely increased in HDRTV, a minimum luminance value (a lowest luminance value) displayable on HDRT is offset, and a so-called misadjusted black level is caused. In such a case, the display is not enabled in a state that a low-luminance signal value in the HDR signal is not changed. For example, when the execution of the above process changes the displayable minimum luminance value into 5 nit, a signal of up to 5 nit cannot be expressed.

Therefore, when the displayable minimum luminance value is set to the reference luminance value (an offset luminance value: for example, 5 nit), in order to express the HDR signal corresponding to 5 nit, it is considered that the display luminance value (the TV signal value) is decided by adding the offset luminance value to the HDR luminance value indicated by the HDR signal. Specifically, in the HDR signal to be input, when the reference luminance value is 18 nit and the offset luminance value is 5 nit, the reference luminance value in the TV signal value becomes 23 nit that is obtained by adding the offset luminance value 5 nit to the reference luminance value 18 nit in the HDR signal.

In the luminance converting process in this exemplary embodiment, as to the luminance values that are not more than the luminance value corresponding to 90% gray, the HDR luminance value is converted into the display luminance value with a ratio between the HDR luminance value corresponding to 18% gray and the display luminance value corresponding to 18% gray being maintained. In the luminance converting process illustrated in FIG. 29, it is ensured that at least a relative relationship of the luminance value with respect to the offset luminance value is kept as to the luminance value in a region where output is performed with the ratio between the HDR luminance value corresponding to 18% gray and the display luminance value corresponding to 18% gray being maintained. That is to say, the display luminance value to be output becomes a value obtained by adding the offset luminance value to the output value in the luminance converting process of this exemplary embodiment. The HDR luminance value at a time of converting the HDR luminance value into the display luminance value with the ratio between the HDR luminance value corresponding to 18% gray and the display luminance value corresponding to 18% gray being maintained is the luminance value that is not more than the luminance value corresponding to 90% gray, but the luminance value corresponding to 90% gray here is one example. That is to say, upper limit and lower limit of the luminance value when the HDR luminance value is converted into the display luminance value with the ratio between the HDR luminance value corresponding to 18% gray and the display luminance value corresponding to 18% gray being maintained may be decided as any values set in HDRTV in advance. In another manner, meta data indicating the upper limit and the lower limit of the luminance value is additionally acquired, and the upper limit and the lower limit may be decided based on the acquired meta data.

Figure 30:
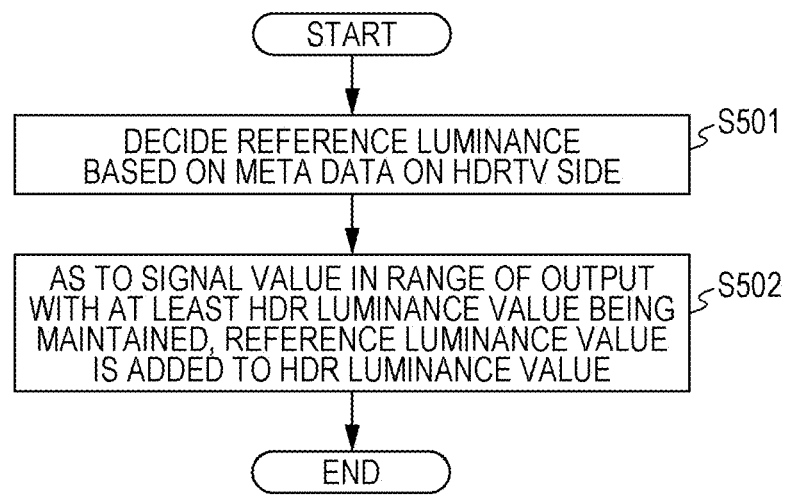
FIG. 30 is a flowchart illustrating an operation for executing the luminance converting process based on an offset luminance value.

FIG. 30 is a flowchart illustrating an operation for executing the luminance converting process based on an offset luminance value. The luminance converting process illustrated in FIG. 30 may be executed in step S402 in FIG. 28.

Luminance converter 302 decides the offset luminance value based on the meta data on the HDRTV side (S501).

Luminance converter 302 adds the offset luminance value to the HDR luminance value in a luminance range where output is performed with the HDR luminance value indicated by the HDR signal being maintained (S502).

That is to say, in the luminance conversion, at least as to a case of the HDR signal indicating the luminance value that is a second reference value (90 nit) or less, luminance converter 302 adds the minimum luminance value displayable on HDRTV included in second meta data (the meta data on the HDRTV side) indicating a display characteristic of HDRTV to a value after the linear conversion so as to decide the value after the addition as the second luminance value.

2-16. Second Modified Example of Second Exemplary Embodiment

The first modified example of the second exemplary embodiment describes that the luminance converting process is switched in response to the meta data on the HDRTV side, but not limited to this, and the luminance converting process may be switched in response to the meta data of the HDR signal and the meta data on the HDRTV side.

Figure 31:
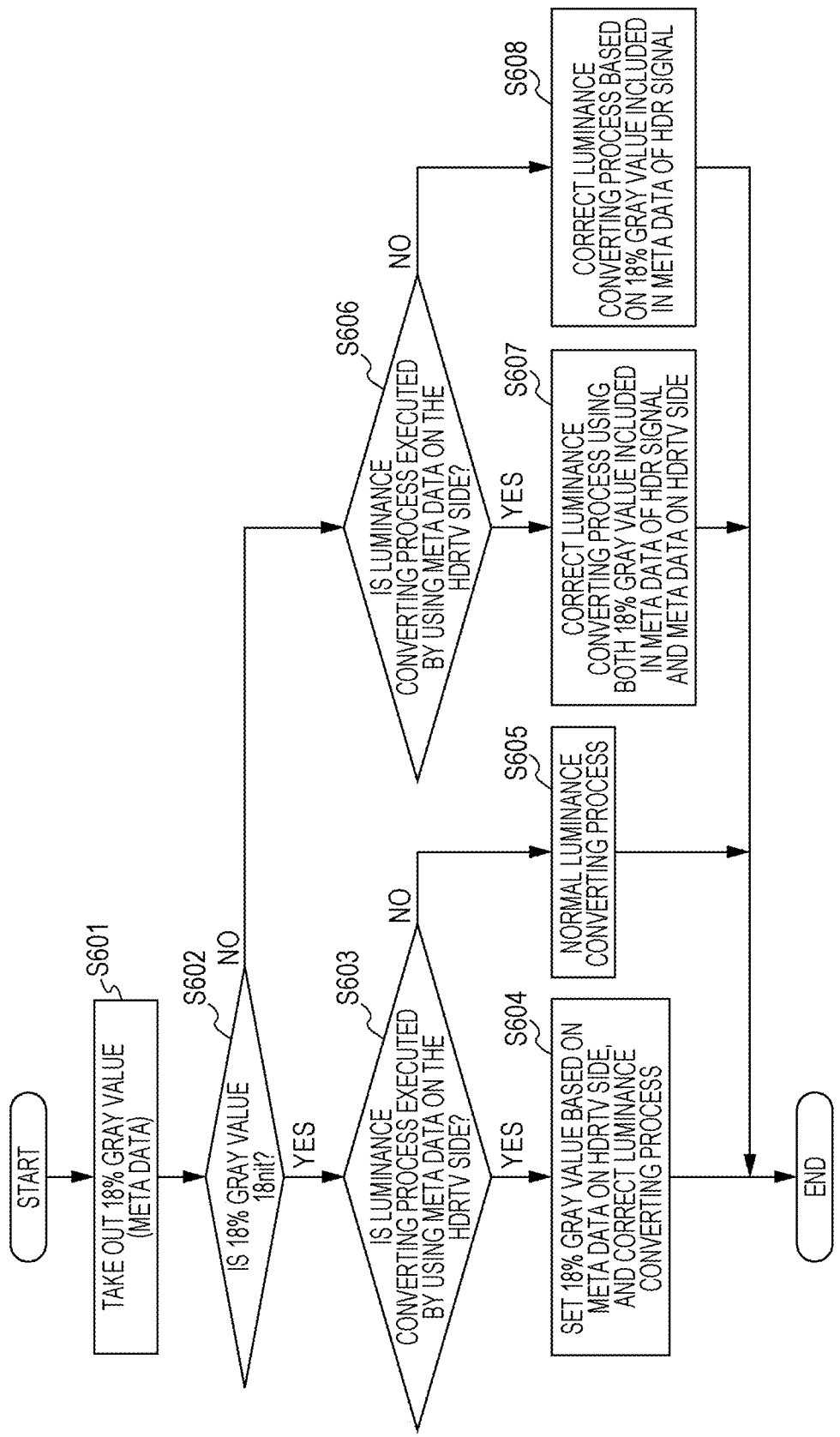
FIG. 31 is a flowchart illustrating an operation of the luminance converting process in a case where a combination of meta data of the HDR signal and meta data on the HDRTV side is used.

FIG. 31 is a flowchart illustrating an operation of the luminance converting process in a case where a combination of meta data of the HDR signal and meta data on the HDRTV side is used.

EOTF converter 301 for HDR in converting apparatus 300 acquires a reference luminance value to be transmitted as the first meta data of the HDR signal (S601).

Luminance converter 302 determines whether the acquired reference luminance value is 18 nit (S602).

When determining that the acquired reference luminance value is 18 nit (Yes in S602), luminance converter 302 determines whether the luminance converting process in response to the meta data on the HDRTV side is executed (S603).

When luminance converter 302 determines that the luminance converting process is executed in response to the meta data on the HDRTV side (Yes in S603), the reference luminance value is set based on the meta data on the HDRTV side, so that the luminance converting process is corrected (S604).

On the other hand, when luminance converter 302 determines that luminance converting process is not executed in response to the meta data on the HDRTV side (No in S604), the normal luminance converting process is executed (S605).

On the other hand, when determining that the acquired reference luminance value is not 18 nit (No in S602), luminance converter 302 determines whether the luminance converting process based on the meta data on the HDRTV side is executed (S606).

When luminance converter 302 determines that the luminance converting process is executed in response to the meta data on the HDRTV side (Yes in S606), the luminance converting process is corrected by using the combination of the reference luminance value included in the meta data of the HDR signal and the meta data on the HDRTV side (S607). Specifically, in step S 607, the luminance conversion is performed so that a relative relationship of the luminance value with respect to the reference luminance value is kept at least as to the luminance value in a region where output is performed with the ratio between the HDR luminance value corresponding to 18% gray and the display luminance value corresponding to 18% gray being maintained. For example, in the luminance conversion described with reference to FIG. 24B, the display luminance value into which the HDR luminance value in the luminance range of not more than the luminance value corresponding to 90% gray is converted is a display luminance value (a TV signal value) obtained after a value obtained by adding the offset luminance value to the display luminance value and is corrected.

On the other hand, when luminance converter 302 determines that the luminance converting process is not executed in response to the meta data on the HDRTV side (No in S606), the luminance converting process is corrected based on the reference luminance value included in the meta data of the HDR signal (S608).

2-17. Third Modified Example of Second Exemplary Embodiment

The second exemplary embodiment and its modified example describe the example where the reference luminance value is fixed, but not limited to this, and different luminance values may be set as the reference luminance value for a plurality of zones of the HDR image.

Figure 32:
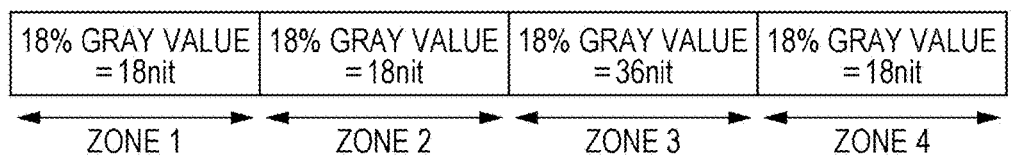
FIG. 32 is a diagram illustrating an example where a reference luminance value is dynamically changed in streams to be sequentially reproduced.

FIG. 32 is a diagram illustrating an example where a reference luminance value is dynamically changed in streams to be sequentially reproduced As illustrated in FIG. 32, the reference luminance value is 18 nit in zone 1, zone 2, and zone 4, but is 36 nit in zone 3. Since the meta data of the HDR signal can be dynamically updated, the meta data is transmitted in synchronization with a frame of the reference luminance value to be updated or near a frame of the luminance value to be updated. In HDRTV, the luminance converting process is started from a frame where updating of the meta data of the HDR signal is instructed or a first frame where the meta data can be updated after the former frame, with updated contents being reflected. The meta data of the HDR signal can be updated only at a head of a random access unit such as GOP (Group Of Pictures) in a video, and the updating may be fixed in the random access unit. Alternatively, the updating may be fixed in a unit of seamless and continuous reproduction. For example, the updating may be fixed between play items to be connected seamlessly in BD.

Figure 33:
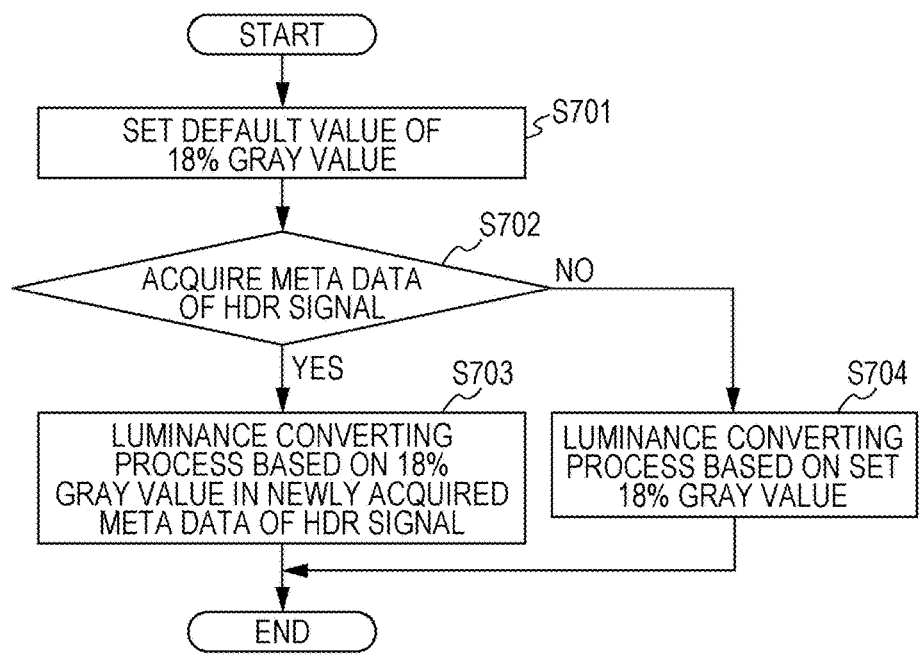
FIG. 33 is a flowchart illustrating an operational example of the display device for reproducing streams where meta data of the HDR signal is dynamically updated as illustrated in FIG. 32.

FIG. 33 is a flowchart illustrating an operational example of the display device for reproducing streams where meta data of the HDR signal is dynamically updated as illustrated in FIG. 32.

Luminance converter 302 sets a default value of the reference luminance value in advance (S701).

Luminance converter 302, then, determines whether the meta data of the HDR signal is acquired (S702).

When luminance converter 302 determines that the meta data of the HDR signal is acquired (Yes in S702), the reference luminance value is reset based on contents of the acquired meta data, and the luminance converting process is executed in response to the reset reference luminance value (S703).

On the other hand, when luminance converter 302 determines that the meta data of the HDR signal is not acquired (No in S702), the luminance converting process is decided based on the default value set in step S701 or the reference luminance value specified from the meta data of the HDR signal acquired first (S704). In a storage media such as BD, the luminance converting process may be changed only at a head of a play item not to be seamlessly connected or a time point of program switching in broadcast.

As a result, in reproduction streams to be sequentially reproduced based on the HDR signal, when the reference luminance value indicated by the meta data of the HDR signal differs between the first zone and the second zone of the reproduction streams, luminance converter 302 converts the first luminance value into the second luminance value in the luminance conversion according to the reference luminance values associated with the first zone and the second zone.

Another Exemplary Embodiment

The exemplary embodiments are described above as the examples of the technique disclosed in this application.

However, the technique of the present disclosure is not limited to them, and thus can be applied to an exemplary embodiment where modification, replacement, addition and omission are suitably made. Further, the components described in the exemplary embodiments may be combined so as to provide a new exemplary embodiment.

Therefore, another exemplary embodiment is described below.

An HDR video is, for example, a video in Blu-ray Disc, DVD, a moving picture distributing site in the Internet, broadcast, or HDD.

Converting apparatus 100 (the HDR/pseudo HDR converting processor) may be present in a disc player, a disc recorder, a set top box, a television, a personal computer, or a smartphone. Converting apparatus 100 may be present in a server apparatus in the Internet.

Display device 200 (the SDR display) is, for example, a television, a personal computer, or a smartphone.

The display characteristic information to be acquired by converting apparatus 100 may be acquired from display device 200 via an HDMI cable or a LAN cable by using HDMI or another communication protocol. The display characteristic information included in model information about display device 200 may be acquired as the display characteristic information to be acquired by converting apparatus 100. Further, the user may manually perform the operation so as to set the display characteristic information in converting apparatus 100. Further, the display characteristic information about converting apparatus 100 may be acquired just before generation of the pseudo HDR video (step S101 to S104) or at a timing of initial setting for the device or display connection. For example, the display characteristic information may be acquired just before the conversion into the display luminance value or at a timing when converting apparatus 100 is connected first to display device 200 via the HDMI cable.

Further, one CPL and one CAL of the HDR video may be present for one contents, or CPL and CAL may be present for each scene. That is to say, in the converting method, luminance information (CPL, CAL), which is associated with a plurality of scenes in a video and includes at least one of a first maximum luminance value in luminance values for a plurality of images forming each scene and an average luminance value of the luminance values of the plurality of images forming each scene, is acquired, and the display luminance value of each scene may be decided based on the luminance information associated with each scene in the first luminance conversion.

Further, CPL and CAL may be included in a medium (Blu-ray Disc, DVD, and the like) that includes also the HDR video, or converting apparatus 100 may acquire them from a place such as the Internet that is different from the HDR video. That is to say, the luminance information including at least one of CPL and CAL may be acquired as meta-information of a video, or may be acquired via a network.

Further, in the first luminance conversion (from HPL into DPL) in converting apparatus 100, CPL, CAL, and the display peak luminance (DPL) are not used but a fixed value may be used. Further, the fixed value may be changeable from the outside. Further, CPL, CAL, and DPL may be switched between several types. For example, only three kinds of values such as 200 nit, 400 nit, and 800 nit, may be used or a value that is the closest to the display characteristic information may be used as DPL.

Further, HDR EOTF does not have to be SMPTE 2084, and another type of HDR EOTF may be used. Further, the maximum luminance (HPL) of the HDR video does not have to be 10,000 nit, and may be, for example, 4,000 nit or 1,000 nit.

Further, a bit width of the code value may be, for example, 16, 14, 12, 10, or 8 bits.

Further, the inverse SDR EOTF conversion is decided based on the display characteristic information, but a fixed conversion function (can be changed from the outside) may be used. In the inverse SDR EOTF conversion, a function defined by Rec.ITU-RBT.1886, for example, may be used. Further, several types of the inverse SDR EOTF conversions are selected, and the conversion that is the most suitable for input/output characteristics of display device 200 may be selectively used.

As the display mode, a fixed mode may be used, and the mode does not have to be included in the display characteristic information.

Converting apparatus 100 does not have to transmit setting information, and fixed display setting may be used or display setting does not have to be changed in display device 200. In this case, display setter 201 is not necessary. Further, the setting information may be flag information indicating whether pseudo HDR video or not, and for example, in a case of the pseudo HDR video, setting may be changed into the brightest display. That is to say, in the display setting (S105), when the acquired setting information indicates a signal indicating a pseudo HDR video converted by using DPL, brightness setting of display device 200 may be switched into the brightest display.

Further, the first luminance conversion (from HPL into DPL) in converting apparatus 100 is performed according to, for example, the following formula.

[Mathematical Formula 1]

A luminance value L is normalized to 0 through 1, and values S1, S2, a, b, and M are set based on CAL, CPL, and DPL. Natural logarithm is represented by "ln". A luminance value V is a value after the conversion through the normalization into 0 through 1. Like the example of FIG. 8A, CAL is 300 nit, CPL is 2,000 nit, and DPL is 750 nit, and the conversion is not performed until CAL+50 nit. When the conversion is performed for a luminance value of 350 nit or more, these values are as follows, for example.

S1=350/10000
S2=2000/10000
M=750/10000
a=0.023

$$b = S1 \lfloor a * \ln(51) = 0.112105$$

That is to say, in the first luminance conversion, when the SDR luminance value is between the average luminance value (CAL) and the first maximum luminance value (CPL), the display luminance value corresponding to the HDR luminance value is decided by using the natural logarithm.

The HDR video is converted by using information such as a contents peak luminance and contents average luminance of the HDR video, so that a conversion formula can be changed depending on contents, and the conversion can be performed with a gradation of HDR being maintained as much as possible. Bad influences such as too dark and too bright states can be repressed. Specifically, the contents peak luminance of the HDR video is mapped on the display peak luminance, so that the gradation is maintained as much as possible. Further, a pixel value of the average luminance or less is not changed so that entire brightness is prevented from being changed.

Further, the HDR video is converted by using the peak luminance value and the display mode of the SDR display so that the conversion formula can be changed based on a display environment of the SDR display, and an HDR-like video (a pseudo HDR video) can be displayed with similar gradation and brightness to those of an original HDR video in accordance with a performance of the SDR display. Specifically, the display peak luminance is decided based on the maximum luminance and the display mode of the SDR display, and the HDR video is converted so as not to exceed the peak luminance value. As a result, the HDR video is displayed without reducing the gradation until brightness that enables display on the SDR display, and the luminance value is reduced with undisplayable brightness becoming displayable brightness.

As a result, undisplayable brightness information is deleted, and display is enabled in a form close to the original HDR video without decreasing the gradation of the displayable brightness. For example, when conversion into a pseudo HDR video where the peak luminance is repressed to 1,000 nit, is performed for display of peak luminance of 1,000 nit, the entire brightness is maintained, and the luminance value is changed based on the display mode of the display. For this reason, the conversion formula of the luminance is changed based on the display mode of the display. If a luminance larger than the peak luminance of the display is allowed in the pseudo HDR video, the large luminance is occasionally replaced by the peak luminance on the display side, and in this case, the HDR video entirely becomes darker than the original HDR video. On the contrary, when luminance smaller than the peak luminance of the display is converted as the maximum luminance, the peak luminance on the display side is replaced by the small luminance, and the HDR video entirely becomes brighter than the original HDR video. Further, since the luminance is smaller than the peak luminance on the display side, a performance relating to the gradation of the display is not used to the utmost extent.

Further, on the display side, the display setting is switched by using the setting information, so that the pseudo HDR video can be displayed more satisfactorily. For example, when the brightness is set to be dark, high luminance display cannot be performed, and thus the HDR feeling is deteriorated. In this case, the display setting is changed or a message for urging the change is displayed, so that the performance of the display is maximized, and display of a high-gradation video is enabled.

A Blu-ray device for reproduction from a 4K-compatible BD or an HDR-compatible BD should be compatible with four TVs including a 2K_SDR-compatible TV, a 2K_HDR-compatible TV, 4K_SDR-compatible TV, and a 4K_HDR-compatible TV. Specifically, the Blu-ray device should support three HDMI/HDCP standards (HDMI1.4/HDCP1.4, HDM12.0/HDCP2.1, and HDM12.1/HDCP2.2).

When the Blu-ray device performs the reproduction from four kinds of Blu-ray discs (the 2K_SDR-compatible BD, the 2K_HDR-compatible BD, the 4K_SDR-compatible BD, and the 4K_HDR-compatible BD), a suitable process and HDMI/HDCP should be selected for each BD (contents) and each connected display device (TV). Further, when a graphic is synthesized with a video, the process should be changed depending on types of BD and the connected display device (TV).

For this reason, an internal process in the Blu-ray device becomes very complicated. In the third exemplary embodiment, various methods for comparatively simplifying the internal process in the Blu-ray device are provided.

[1] For example, when the HDR signal is displayed on an HDR-incompatible TV, conversion from HDR into SDR is necessary. On the contrary, in the third exemplary embodiment, in order to provide this conversion as an option to the Blu-ray device, a BD structure that is a dual stream disc (Dual Streams Disc) is proposed.

[2] Further, in the third exemplary embodiment, graphic streams are restricted, and types of combinations of video streams and graphic streams are reduced.

[3] In the third exemplary embodiment, since the dual stream discs and the limitation of the graphic streams greatly reduce a number of combinations of complicated processes in the Blu-ray device.

[4] In the third exemplary embodiment, even when pseudo HDR conversion is introduced, an internal process and an HDMI process that does not cause inconsistencies in the process for the dual stream discs are presented.

In the converting method of the present disclosure, when an HDR video is displayed on SDRTV, a "HDR/pseudo HDR converting process" is realized so that the HDR video is not converted into an SDR video of 100 nit or less but converted with gradation in a zone of 100 nit or more being maintained to a certain extent by using a fact that the peak luminance of SDRTV exceeds 100 nit (normally 200 nit or more), and is converted into a pseudo HDR video close to original HDR to be capable of being displayed on SDRTV.

Further, in the converting method, the converting method of "the HDR/pseudo HDR converting process" may be switched in response to the display characteristics (the maximum luminance value, the input/output characteristics, and the display mode) of SDRTV.

As a method for acquiring the display characteristic information, the following methods are considered: (1) automatically acquiring the information through HDMI or a network; (2) generating the information in a manner that a user inputs information such as a name of a manufacturer and a product number; and (3) acquiring the information from a cloud or the like using the information such as a name of a manufacturer and a product number.

Further, as timing of acquiring the display characteristic information of converting apparatus 100, the following timings are considered: (1) acquiring the information just before the pseudo HDR conversion; and (2) acquiring the information at a time of first connecting with display device 200 (SDRTV or the like) (the connection is established).

Further, as to the converting method, the converting method may be switched in response to the luminance information (CAL and CPL) of the HDR video.

For example, as the method for acquiring the luminance information of the HDR video in converting apparatus 100, the following methods are considered: (1) acquiring the information as meta-information attached to the HDR video; (2) acquiring the information in a manner that the user inputs title information about contents; and (3) acquiring the information through a cloud or the like using the input information input from the user.

Further, details of the converting method are as follows: (1) the conversion is performed without exceeding DPL; (2) the conversion is performed so that CPL becomes DPL; (3) the luminance around CAL or less is not changed; (4) the conversion is performed by using the natural logarithm; and (5) a clipping process is performed on DPL.

Further, in the converting method, in order to heighten an effect of the pseudo HDR, the display settings such as the display mode and the display parameters of SDRTV can be transmitted to display device 200 so as to be switched. For example, a message that urges the user to perform the display setting may be displayed on the screen.

The meta data of the HDR signal is not limited to a luminance value corresponding to 18% gray, and thus another value may be used as long as this value can be used as a reference of the gray level in HDRTV.

Upper limit and lower limit luminance values at a time of converting the HDR luminance value into the display luminance value may be set based on the maximum luminance value and the minimum luminance value for enabling output from HDRTV with the ratio between the HDR luminance value corresponding to 18% gray and the display luminance value corresponding to 18% gray being maintained. For example, when the maximum luminance value of HDRTV is a luminance value corresponding to 80% gray, the maximum luminance value of HDRTV is output with the ratio between the HDR luminance value corresponding to 18% gray and the display luminance value corresponding to 18% gray being maintained until the luminance value corresponding to 70% gray. The luminance values corresponding to 70% or more gray may be subjected to the linear conversion based on the second maximum luminance value (DPL) of HDRTV. The similar process can be executed also on the minimum luminance value.

In the above exemplary embodiments, the respective components may be constituted by dedicated hardware, or may be realized by executing software programs suitable for the respective components. The respective components may be realized by a such a manner that a program executing unit such as CPU or a processor reads software programs recorded in a recording medium such as a hard disc or a semiconductor memory so as to execute the programs.

The display method and the display device according to one or more of the exemplary embodiments of the present disclosure are described above in the exemplary embodiments, but the present disclosure is not limited to the exemplary embodiments. Exemplary embodiments obtained by making various modifications, which the person skilled in the art arrives at, and exemplary embodiments obtained by combining components in different exemplary embodiments may be included in a scope of one or some of the exemplary embodiments of the present disclosure without departing from the scope of the present disclosure.

The present disclosure is useful as the converting method and the converting apparatus that can suitably convert luminance from a first luminance range to a second luminance range that is narrower than the first luminance range.

What is claimed is:

1. A converting method for converting luminance of an input video in order to display the video on a display device, comprising:
   acquiring a first luminance signal indicating a first luminance value of the video in a first luminance range where a maximum luminance value is defined as a first maximum luminance value that exceeds 100 nit, the luminance of the video being formed by the first luminance value;
   selecting a luminance converting process to be executed from among a plurality of luminance converting processes based on a reference luminance value corresponding to reference reflectance included in first meta data of the acquired first luminance signal; and
   converting the first luminance value indicated by the acquired first luminance signal into a second luminance value in a second luminance range where a maximum luminance value is defined as a second maximum luminance value that is smaller than the first maximum luminance value and larger than 100 nit based on the selected luminance converting process, wherein
   in the selecting, the luminance converting process is selected based on whether the reference luminance value is a first reference value,
   in the converting, when the reference luminance value is a second reference value different from the first reference value,
   the first luminance value indicated by the first luminance signal, which indicates a luminance value not more than a third reference value larger than the second reference value, is decided as the second luminance value, and
   the first luminance value, which is indicated by the first luminance signal indicating a luminance value exceeding the third reference value and is in a range from the third reference value to the second maximum luminance value displayable on the display device is subjected to linear conversion where the first maximum luminance value is made to correspond to the second maximum luminance value so that the first luminance value is converted into the second luminance value.

* * * * *

UNITED STATES PATENT AND TRADEMARK OFFICE
CERTIFICATE OF CORRECTION

PATENT NO. : 9,948,884 B2
APPLICATION NO. : 15/613494
DATED : April 17, 2018
INVENTOR(S) : Kozuka Page 1 of 1

It is certified that error appears in the above-identified patent and that said Letters Patent is hereby corrected as shown below:

In Claim 1, at Column 38, Line 40 please insert -- , -- after "device".

Signed and Sealed this
Tenth Day of July, 2018

Andrei Iancu
*Director of the United States Patent and Trademark Office*